(12) United States Patent
Wang et al.

(10) Patent No.: US 12,438,806 B2
(45) Date of Patent: *Oct. 7, 2025

(54) LOAD-BASED MANAGEMENT FOR NVME OVER TCP CONNECTIONS

(71) Applicant: Oracle International Corporation, Redwood Shores, CA (US)

(72) Inventors: Qiang Wang, Bellevue, WA (US); Kent Lee, Ladera Ranch, CA (US)

(73) Assignee: Oracle International Corporation, Redwood Shores, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 18/520,207

(22) Filed: Nov. 27, 2023

(65) Prior Publication Data
US 2024/0098014 A1    Mar. 21, 2024

Related U.S. Application Data

(63) Continuation of application No. 18/318,525, filed on May 16, 2023, now Pat. No. 11,924,086, which is a
(Continued)

(51) Int. Cl.
*H04L 45/12*    (2022.01)
*H04L 43/067*    (2022.01)
*H04L 45/24*    (2022.01)

(52) U.S. Cl.
CPC .......... *H04L 45/123* (2013.01); *H04L 43/067* (2013.01); *H04L 45/24* (2013.01)

(58) Field of Classification Search
CPC ............ G06F 2009/45579; G06F 2009/45595; G06F 3/0638; G06F 3/0665; G06F 3/067;
(Continued)

(56) References Cited

U.S. PATENT DOCUMENTS 6,049,546 A    4/2000    Ramakrishnan
6,671,256 B1 *  12/2003    Xiong ................. H04J 14/0227
                                            370/437
(Continued)

FOREIGN PATENT DOCUMENTS

WO    2022057439 A1    3/2022

OTHER PUBLICATIONS

U.S. Appl. No. 17/698,987, Notice of Allowance, Mailed On Feb. 23, 2024, 10 pages.
(Continued)

*Primary Examiner* — Oanh Duong
(74) *Attorney, Agent, or Firm* — Kilpatrick Townsend & Stockton LLP

(57) ABSTRACT

The disclosed systems, methods and computer readable media relate to managing Non-Volatile Memory Express (NVMe) over Transmission Control Protocol (TCP) (NVMeOTCP) connections between a smart network interface card (smartNIC) and a block storage data plane (BSDP) of a cloud computing environment. A software agent ("agent") executing at the smartNIC may manage a number of network paths (active and, in some cases, passive network paths). The agent may monitor the network traffic (e.g., input/output operations (IOPS)) through the paths (e.g., using established NVMeOTCP connections corresponding to the paths). If a condition is met relating to a performance threshold associated with the monitored paths, the agent may increase or decrease the number established NVMeOTCP connections to match real time network conditions.

20 Claims, 18 Drawing Sheets

Related U.S. Application Data continuation-in-part of application No. 17/747,277, filed on May 18, 2022.

(58) Field of Classification Search
CPC ................ G06F 9/45558; G06F 3/061; H04L 41/046; H04L 43/062
See application file for complete search history.

(56) References Cited

U.S. PATENT DOCUMENTS

| | | | |
|---|---|---|---|
| 7,330,430 | B2 | 2/2008 | Lodha |
| 7,580,355 | B2 | 8/2009 | Zhao et al. |
| 7,787,359 | B2 | 8/2010 | He et al. |
| 7,818,606 | B1 | 10/2010 | Stack et al. |
| 8,223,767 | B2 | 7/2012 | Nanda et al. |
| 8,817,619 | B2 | 8/2014 | Lai |
| 9,923,798 | B1* | 3/2018 | Bahadur ................ H04L 45/24 |
| 9,998,394 | B2 | 6/2018 | Agrawal et al. |
| 10,298,495 | B2 | 5/2019 | Tang |
| 10,523,553 | B2 | 12/2019 | Park et al. |
| 10,756,886 | B2 | 8/2020 | Ganguli et al. |
| 10,887,245 | B2 | 1/2021 | Qureshi et al. |
| 10,963,189 | B1 | 3/2021 | Neelakantam et al. |
| 11,226,773 | B1* | 1/2022 | Patel .................... G06F 3/0664 |
| 11,327,812 | B1* | 5/2022 | Shveidel ............... G06F 3/0659 |
| 11,374,609 | B2 | 6/2022 | Lee et al. |
| 11,444,996 | B2 | 9/2022 | Augé et al. |
| 11,637,722 | B2 | 4/2023 | Tang |
| 11,650,745 | B1 | 5/2023 | Lee et al. |
| 11,924,086 | B2* | 3/2024 | Wang .................... G06F 3/0638 |
| 12,021,757 | B2 | 6/2024 | Lee et al. |
| 12,346,565 | B2 | 7/2025 | Wang et al. |
| 12,348,432 | B2 | 7/2025 | Lee et al. |
| 2010/0131669 | A1 | 5/2010 | Srinivas et al. |
| 2013/0003559 | A1* | 1/2013 | Matthews ........... H04L 43/0876 370/241 |
| 2013/0166727 | A1 | 6/2013 | Wright et al. |
| 2015/0188796 | A1* | 7/2015 | Bugenhagen ....... H04L 43/0811 370/242 |
| 2015/0215211 | A1 | 7/2015 | Bhikkaji et al. |
| 2015/0281288 | A1* | 10/2015 | Levinson ................ H04L 47/41 709/219 |
| 2015/0319237 | A1 | 11/2015 | Hussain et al. |
| 2017/0034843 | A1 | 2/2017 | Liu et al. |
| 2017/0070912 | A1 | 3/2017 | Kozat et al. |
| 2017/0230296 | A1 | 8/2017 | Kim |
| 2017/0324813 | A1 | 11/2017 | Jain et al. |
| 2018/0287912 | A1* | 10/2018 | Zabarsky ................ H04L 41/12 |
| 2018/0295042 | A1* | 10/2018 | Koster .................... H04L 47/11 |
| 2018/0375760 | A1 | 12/2018 | Saavedra |
| 2019/0073141 | A1 | 3/2019 | Brennan et al. |
| 2019/0073162 | A1 | 3/2019 | Karr et al. |
| 2019/0073265 | A1 | 3/2019 | Brennan et al. |
| 2019/0190851 | A1 | 6/2019 | Hsu et al. |
| 2020/0174671 | A1 | 6/2020 | Margaglia et al. |
| 2020/0264954 | A1 | 8/2020 | Belgaied et al. |
| 2020/0278892 | A1* | 9/2020 | Nainar .................... H04L 67/10 |
| 2021/0111998 | A1 | 4/2021 | Saavedra |
| 2021/0279187 | A1 | 9/2021 | Puder et al. |
| 2021/0409262 | A1* | 12/2021 | Watson ................... H04L 43/50 |
| 2022/0091754 | A1 | 3/2022 | Raman et al. |
| 2022/0206908 | A1 | 6/2022 | Brar et al. |
| 2022/0229787 | A1* | 7/2022 | Veluswamy ........ G06F 13/1668 |
| 2022/0232073 | A1* | 7/2022 | Kuttuva Jeyaram ... H04L 67/14 |
| 2022/0311703 | A1 | 9/2022 | K et al. |
| 2022/0329520 | A1* | 10/2022 | Degrace ................. H04L 45/12 |
| 2022/0353197 | A1 | 11/2022 | Singh |
| 2023/0029796 | A1 | 2/2023 | Li |
| 2023/0032441 | A1 | 2/2023 | Singh et al. |
| 2023/0281049 | A1* | 9/2023 | Dong ...................... G06F 3/065 718/104 |

OTHER PUBLICATIONS

U.S. Appl. No. 18/318,457, Non-Final Office Action mailed on Sep. 10, 2024, 18 pages.
U.S. Appl. No. 18/649,290, "Non-Final Office Action", mailed Jul. 2, 2025, 13 pages.
U.S. Appl. No. 18/318,457, Notice of Allowance, mailed on Mar. 26, 2025, 9 pages.
U.S. Appl. No. 18/672,857, Notice of Allowance, mailed on Mar. 26, 2025, 10 pages.
U.S. Appl. No. 17/747,277, Non-Final Office Action, mailed on Apr. 2, 2025, 8 pages.
Build Ultra High-Performance Storage Applications with the Storage Performance Development Kit, SPDK, Available Online at: https://spdk.io/, Accessed from Internet on Oct. 3, 2022, 5 pages.
NVM Express—Scalable, Efficient, and Industry Standard, Available Online at: https://nvmexpress.org/, Accessed from Internet on Oct. 3, 2022, 5 pages.
U.S. Appl. No. 17/515,357, Notice of Allowance mailed on Dec. 27, 2022, 11 pages.
U.S. Appl. No. 17/698,987, Non-Final Office Action mailed on Jul. 28, 2023, 14 pages.
U.S. Appl. No. 18/318,525, Notice of Allowance mailed on Oct. 10, 2023, 10 pages.
Couvert, High Speed I/O Processor for NVMe over Fabric, Datacenter Product Marketing, 2016, 18 pages.
Li et al., Leapio: Efficient and Portable Virtual Nvme Storage on Arm Socs, Proceedings on the International Conference on Architectural Support for Programming Languages and Operating Systems (ASPLOS), Mar. 13, 2020, 15 pages.

* cited by examiner

LOAD-BASED MANAGEMENT FOR NVME OVER TCP CONNECTIONS

CROSS-REFERENCE TO RELATED APPLICATIONS

This application is a continuation of U.S. Non-Provisional patent application Ser. No. 18/318,525, filed on May 16, 2023, entitled "LOAD-BASED MANAGEMENT FOR NVME OVER TCP CONNECTIONS", which is a continuation-in-part of U.S. Non-Provisional patent application Ser. No. 17/747,277, filed on May 18, 2022, entitled "A Single Hop Approach for Distributed Block Storage via a Network Virtualization Device," the disclosure of which is herein incorporated by reference in its entirety for all purposes.

BACKGROUND

Creating and running a cloud service can include connecting persistent storage (e.g., a block storage data plane (BSDP) component) to host instances (bare metal (BM) instances, virtual machine (VM) instances) via connections made by a smartNIC of the host instance. In some cases, these connections are fixed. Real-time network traffic (e.g., input/output operations and throughput) may be significantly lower or higher than the throughput for which the fixed connections were configured to handle. This mismatch between real time network traffic and the number of connections used wastes CPU resources and memory (e.g., CPU and memory of the smartNIC) and/or increases latency of the system.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

At least one embodiment includes a method. The method may comprise managing, by a software agent at a smart network interface card of a cloud computing environment, a set of one or more active network paths according to a performance threshold associated with the set of one or more active network paths. In some embodiments, the set of one or more active network paths may be associated with a set of one or more established network connections between the smart network interface card and a storage data plane of the cloud computing environment. The method may comprise monitoring, by the software agent executing at the smart network interface card, network traffic utilizing the set of one or more established network connections associated with the set of one or more active network paths. The method may comprise determining, by the software agent executing at the smart network interface card, that the network traffic utilizing the set of one or more established network connections associated with the set of one or more active network paths has met a condition relating to the performance threshold associated with the set of one or more active network paths. The method may comprise, responsive to determining that the network traffic has met the condition relating to the performance threshold associated with the set of one or more active network paths, modifying, by the software agent executing at the smart network interface card, a number of established network connections between the smart network interface card and the storage data plane of the cloud computing environment. In some embodiments, the number of established network connections corresponds to the set of one or more active network paths.

In some embodiments, modifying the number of established network connections between the smart network interface card and the storage data plane of the cloud computing environment comprises at least one of: 1) activating a first active network path of the set of one or more active network paths causing an increase to the number of established network connections between the smart network interface card and the storage data plane of the cloud computing environment, or 2) deactivating a second active network path of the set of one or more active network paths causing a decrease to the number of established network connections between the smart network interface card and the storage data plane of the cloud computing environment.

In some embodiments, modifying the number of established network connections between the smart network interface card and the storage data plane of the cloud computing environment comprises activating an active network path of the set of one or more active network paths. In some embodiments, activating the active network path comprises establishing a network connection associated with the active network path. In some embodiments, the network connection is established between the smart network interface card and the storage data plane of the cloud computing environment. In some embodiments, establishing the network connection increases the number of established network connections between the smart network interface card and the storage data plane of the cloud computing environment.

In some embodiments, modifying the number of established network connections between the smart network interface card and the storage data plane of the cloud computing environment comprises deactivating an active network path of the set of one or more active network paths, and wherein deactivating the active network path comprises terminating a previously established network connection associated with the active network path. In some embodiments, the previously established network connection may be between the smart network interface card and the storage data plane of the cloud computing environment. In some embodiments, terminating the previously established network connection decreases the number of established network connections between the smart network interface card and the storage data plane of the cloud computing environment.

In some embodiments, the performance threshold corresponds to a throughput capability of a storage volume of the storage data plane of the cloud computing environment. In some embodiments, the set of one or more active network paths correspond to respective network connections to different storage devices corresponding to the storage volume of the storage data plane of the cloud computing environment.

In some embodiments, the monitoring comprises calculating 1) input/output operations of the network traffic over a time period, and 2) a throughput rate of the network traffic corresponding to the input/output operations of the network traffic over the time period.

In some embodiments, determining, by the software agent, that the network traffic utilizing the set of one or more established network connections associated with the set of one or more active network paths has met the condition relating to the performance threshold associated with the set of one or more active network paths, further comprises: 1) comparing, by the software agent, the throughput rate of the network traffic corresponding to the input/output operations of the network traffic over the time period to the performance threshold, and 2) determining, by the software agent, that the throughput rate has exceeded the performance threshold for at least a threshold period of time.

In some embodiments, determining, by the software agent, that the network traffic utilizing the set of one or more established network connections associated with the set of one or more active network paths has met the condition relating to the performance threshold associated with the set of one or more active network paths, further comprises: 1) comparing, by the software agent, the throughput rate of the network traffic corresponding to the input/output operations of the network traffic over the time period to the performance threshold, and 2) determining, by the software agent, that the performance threshold has exceeded the throughput rate of the network traffic corresponding to the input/output operations of the network traffic for at least a threshold period of time.

In some embodiments, an active network path of the set of one or more active network paths corresponds to a respective network path group of a set of one or more network path groups. In some embodiments, each respective network path group comprises a single active path and two passive network paths and the software agent is configured to manage the single active paths and two passive networks paths of each of the set of one or more network path groups.

In some embodiments, each passive network path of the two passive network paths is associated with an unestablished network connection while the single active path of a given network path group is operational.

In some embodiments, each network path group is associated with a namespace of one or more namespaces. In some embodiments, each namespace corresponds to a respective storage volume of one or more storage volumes of the storage data plane of the cloud computing environment.

Some embodiments include a system. The system may comprise memory configured to store instructions and one or more processors configured to execute the instructions to cause the system to perform the methods disclosed herein. In some embodiments, at least one of the one or more processors is a processor of a smart network interface card. The processor(s) may manage, by a software agent executing at the smart network interface card of a host machine of a cloud computing environment, a set of one or more active network paths according to a performance threshold associated with the set of one or more active network paths. In some embodiments, the set of one or more active network paths may be associated with a set of one or more established network connections between the smart network interface card and a storage data plane of the cloud computing environment. The processor(s) may monitor, by the software agent executing at the smart network interface card, network traffic utilizing the set of one or more established network connections associated with the set of one or more active network paths. The processor(s) may determine, by the software agent executing at the smart network interface card, that the network traffic utilizing the set of one or more established network connections associated with the set of one or more active network paths has met a condition relating to the performance threshold associated with the set of one or more active network paths. The processor(s) may, responsive to determining that the network traffic has met the condition relating to the performance threshold associated with the set of one or more active network paths, modify, by the software agent executing at the smart network interface card, the set of one or more active network paths to modify a number of established network connections between the smart network interface card and the storage data plane of the cloud computing environment.

In some embodiments, executing the instructions further causes the system to at least receive, by the software agent executing at the smart network interface card, configuration data specifying a number of the set of one or more active network paths and the performance threshold associated with set of one or more active network paths. In some embodiments, the configuration data further specifies for each active network path of the set of one or more active network paths: 1) a first network address associated with the smart network interface card, and 2) a second network address associated with a corresponding storage volume of the storage data plane of the cloud computing environment. In some embodiments, executing the instructions further causes the system to at least establish, by the software agent according to the configuration data, a number of active network connections corresponding to each of the set of one or more active network paths.

In some embodiments, each active network path of the set of one or more active network paths corresponds to a respective network path group of a set of one or more network path groups, a network path group of the set of one or more network path groups comprising an active network path and at least one passive network path. In some embodiments, the software agent is configured to manage a respective active network path and at least one respective passive network path of each of the set of one or more network path groups.

In some embodiments, modifying the number of established network connections between the smart network interface card and the storage data plane of the cloud computing environment comprises activating a particular network path group of the set of one or more network path groups. In some embodiments, activating the particular network path group comprises establishing a network connection associated with the respective active network path of the particular network path group, the network connection being established between the smart network interface card and the storage data plane of the cloud computing environment. In some embodiments, establishing the network connection increases the number of established network connections between the smart network interface card and the storage data plane of the cloud computing environment.

In some embodiments, modifying the number of established network connections between the smart network interface card and the storage data plane of the cloud computing environment comprises deactivating a particular network path group of the set of one or more network path groups. In some embodiments, deactivating the particular network path group comprises terminating a previously established network connection associated with the respective active network path of the particular network path group. In some embodiments, the previously established network connection being between the smart network interface card and the storage data plane of the cloud computing environment. In some embodiments, terminating the previously established network connection decreases the number of established network connections between the smart network interface card and the storage data plane of the cloud computing environment.

In some embodiments, the set of one or more active network paths is a first set of one or more active network paths corresponding to a first namespace. In some embodiments, the software agent is further configured to manage a second set of one or more active network paths corresponding to a second namespace.

In some embodiments, the smart network interface card comprises a namespace controller that is configured to route the network traffic through the set of one or more active network paths. In some embodiments, the namespace controller and the set of one or more active network paths may be associated with a common namespace corresponding to a storage volume of the storage data plane of the cloud computing environment.

In some embodiments, monitoring, by the software agent executing at the smart network interface card, the network traffic utilizing the set of one or more established network connections associated with the set of one or more active network paths further comprises obtaining, from the namespace controller configured to route traffic through the set of one or more active network paths, network traffic data corresponding to the network traffic utilizing the set of one or more established network connections associated with the set of one or more active network paths. In some embodiments, monitoring, by the software agent executing at the smart network interface card, the network traffic utilizing the set of one or more established network connections associated with the set of one or more active network paths further comprises determining, from the network traffic data, a throughput rate of the network traffic that corresponds to input/output operations of the network traffic over a period of time.

In some embodiments, determining, by the software agent executing at the smart network interface card, that the network traffic utilizing the set of one or more established network connections associated with the set of one or more active network paths has met the condition relating to the performance threshold associated with the set of one or more active network paths further comprises identifying that the throughput rate has exceeded or fallen under the performance threshold for the period of time.

DETAILED DESCRIPTION

Figure 1:
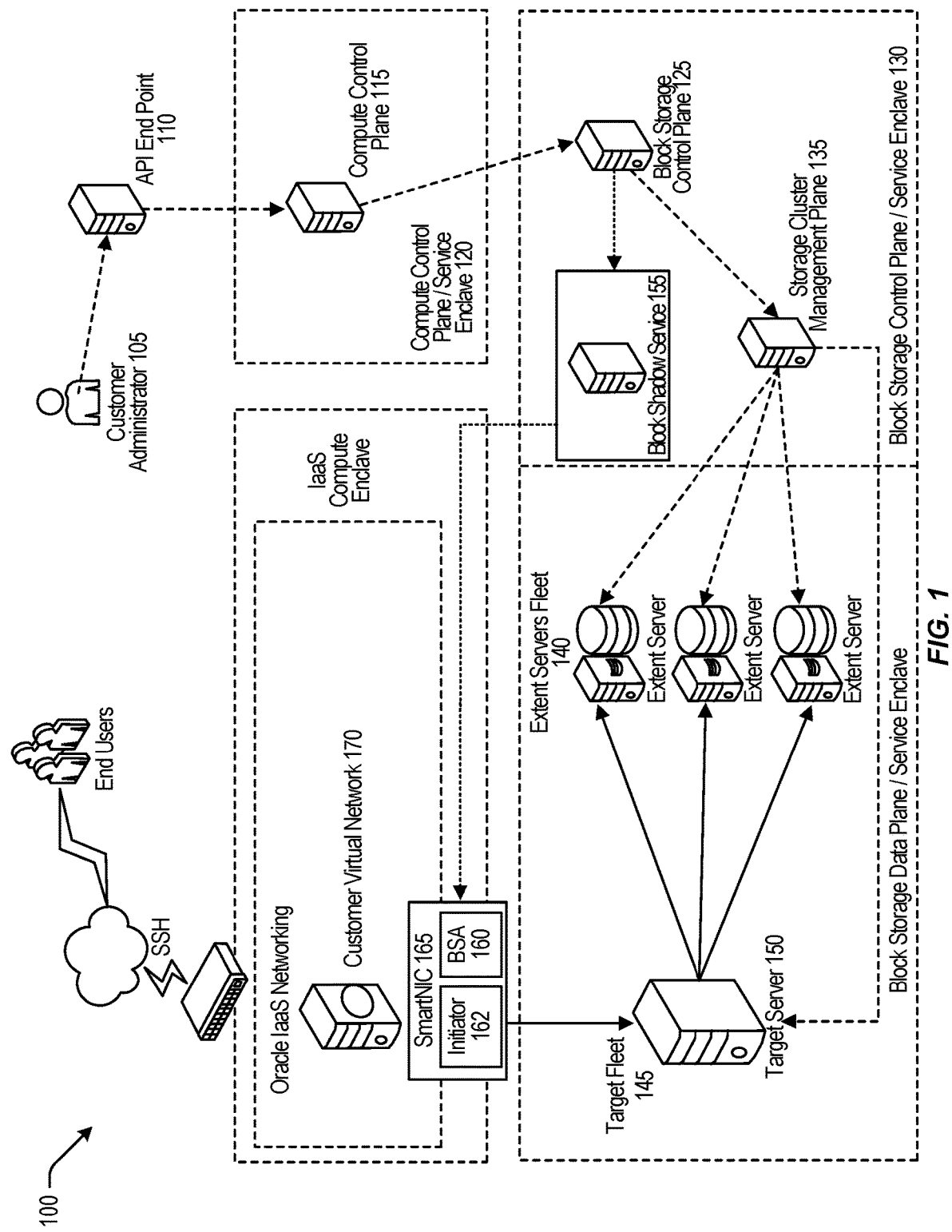
FIG. 1 is a simplified control path diagram showing cloud infrastructure components for attaching Block Storage Data Plane (B SDP) persistent storage, according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to managing Non-Volatile Memory Express (NVMe) over Transmission Control Protocol (TCP) connections ("NVMeOTCP") between NVMe components executing at a smart network interface card (smartNIC) of a host machine of a cloud computing environment, and block storage data plane components (e.g., target servers serving as data endpoints for a block storage fleet of servers). NVMe, and other networking protocols such as iSCSI, may be used to provide block-level storage access between a host machine (e.g., via a smartNIC) and a Block Storage Data Plane (BSDP) persistent storage. A smartNIC refers to a type of network interface card that includes one or more on-board processors and is configured with computing components for network protocol management and, potentially, any suitable combination of programmable compute, security component (e.g., cryptographic operations for performing encryption/decryption), and/or storage components. In some embodiments, the smartNICs utilized in the examples herein utilize NVMe and/or another networking protocol, to enable access to BSDP persistent storage access through the smartNIC of a host machine.

Conventionally, the number of NVMeOTCP connections between the host machine and the block storage data plane of a cloud computing environment were fixed. Once configured and established, the same number of active NVMeOTCP connections were utilized regardless of the actual load (e.g., the number of input/output operations per second, throughput, etc.). By way of example, a block volume may be associated with maximum performance value indicating a maximum number and/or rate (e.g., input/output operations per second (IOPS)) for which the volume is configured to handle (e.g., 2 million IOPS). A number of NVMeOTCP connections for the volume (e.g., a volume associated with a namespace) may be identified based on the maximum performance threshold of the volume and a performance capability associated with each of the active NVMeOTCP connections (e.g., 60,000 IOPS). For example, if a maximum performance threshold X requires Y NVMe/TCP connections, 1000 volumes with maximum performance threshold X require 1000*Y NVMe/TCP connections. Conventionally, these connections were established and fixed. However, it is unlikely that each volume will be running at its maximum performance threshold because users may not fully utilize the block volume, and a smartNIC has limits on the number of IOPS and throughput it can handle. Therefore, it is likely that NVMeOTCP connections were established and largely unutilized, wasting CPU and memory resources at the smartNIC.

Techniques discussed herein are directed to monitoring the number of NVMe input/output (TO) operations and throughput at the smartNIC at runtime and adjusting the number of established NVMeOTCP connections between the smartNIC and the block storage data plane (e.g., targets/endpoints of the block storage data plane) according to monitoring such that the number of NVMeOTCP connections varies with the load.

Non-Volatile Memory Express (NVMe) System Background

Creating and running a cloud service can include mounting and connecting persistent storage (e.g., a block storage data plane (BSDP) component) to cloud instances. The persistent storage can be created, using a console or application programming interface (API), and linked to cloud instances (e.g., a virtual machine (VM) host or a bare metal (BM) host machine running in the cloud). Linking, or attaching, persistent storage of a block storage data plane to a cloud instance can be performed using a communication protocol. The attached storage can communicate with the cloud instance's guest operating system (OS) using the protocol.

Connections between a cloud instance and persistent storage within the block storage data plane ("BSDP persistent storage," for brevity) are flexible and a number of configurations are possible. For instance, the BSDP persistent storage can be attached to one or more cloud instances simultaneously. The data in the BSDP persistent storage is durable and the storage can retain data after an attachment to a cloud instance is removed. Data can be migrated between instances by detaching BSDP persistent storage from one cloud instance and attaching the BSDP persistent storage to a second instance.

Durable BSDP persistent storage can allow for instance scaling. A cloud instance can be deleted without destroying or reformatting the corresponding BSDP persistent storage. After the cloud instance is deleted, the BSDP persistent storage can be attached to a new instance. The new instance can be created with a different instance type or shape. For example, the new cloud instance can be a VM or a BM regardless of the deleted instance's type. Additionally, the number of cores in a cloud instance can be changed by deleting an initial instance and creating a new instance with a different number of cores.

A transfer of data through an attachment can be started with an endpoint called an initiator. Data can be sent from the initiator to an endpoint of the B SDP persistent storage that can receive data. This endpoint is referred to as "a target." An agent can set up the target to receive data and forward the data to the target. A number of advantages can be provided by locating the initiator in a smart network interface card (smartNIC). A user may need to provide login information or other configuration from the cloud instance if the initiator is located in the instance. Additionally, it can be difficult to keep the initiator functional across different guest OS types and OS versions. Locating the initiator in the smartNIC can also free customer resources that would be used to run the initiator.

Attachments can be provided using storage networking standards including Internet Small Computer Systems Interface (iSCSI), paravirtualized (PV) iSCSI, and Non-Volatile Memory Express (NVMe). iSCSI can provide attachments for bare metal (BM) devices with the initiator running from inside a customer instance. The initiator for PV iSCSI attachments can be set up and run inside a cloud instance's hypervisor, and PV iSCSI attachments can be limited to running on virtual machines (VM). The initiator for NVMe attachments can be run on a smartNIC. Accordingly, NVMe attachments can provide attachments for both VM and BM networks.

FIG. 1 is a simplified control path diagram 100 showing cloud infrastructure components for attaching BSDP persistent storage, according to an embodiment, for example, using NVMe. A customer administrator 105 can submit a request for a new storage attachment at an application programming interface (API) endpoint 110. In some examples, the customer administrator 105 may be any entity that manages or otherwise administers the use of cloud instances for a customer of the cloud service. In some instances, the API endpoint 110 may be an interface where customer's (e.g., customer administrator 105) can access the cloud service resources, for example, by making requests to have operations performed by the cloud service on resources managed for the customer. The request can be forwarded to the compute control plane 115 in a compute control plane service enclave 120. In some instances, compute control plane 115 can be a series of APIs that can provision, manage, reconfigure, or terminate resources based on user requests. The request can be forwarded from compute control plane 115 to the block storage control plane 125 in the block storage control plane enclave 130. In some examples, the block storage control plane 125 can be a series of APIs that can provision, manage, reconfigure, or terminate block storage.

A request that is received at block storage control plane 125 can be forwarded to the storage cluster management plane 135. Storage cluster management plane 135 can manage server fleets, and, for example, storage cluster management plane 135 can manage extent servers fleet 140 and target fleet 145. In some examples, storage cluster management plane 135 can configure and monitor extent servers fleet 140 or target fleet 145, and extent servers fleet 140 can include servers storing striped and encrypted customer data. Extent servers fleet 140 may be an example of BSDP persistent storage. Volumes can be striped across multiple extent servers in extent servers fleet 140. Extent servers can be part of a block storage data plane service that handles extent-level I/O and stores the data for replication. In response to the request, storage cluster management plane 135 can identify at least one target server 150 in the target fleet 145 as a target server for the attachment (e.g., a target server to which initiator 162 is to connect). In some instances, target server 150 can be a server that manages the flow of customer data to and from extent servers fleet 140. Target server 150 can accept I/O requests from an NVMe initiator (e.g., initiator 762) operating at smartNIC 165 and send the requests to extent servers fleet 140. The storage cluster management plane 135 can select the target server 150 based at least in part on the load experienced by the servers in the target fleet 145, or the expected volume for the attachment. Storage cluster management plane 135 can forward information about the new attachment to the selected target server 150 or the extent server fleet 140. The information can identify one or more target servers that are able to receive traffic from the new attachment.

The request can be forwarded from block storage control plane 125 to the block shadow service 155. The block shadow service 155 can act as an agent, and block shadow service 155 can communicate with the block smartNIC agent (BSA) 160 in smartNIC 165. In some examples, smartNIC 165 can be hardware that can connect the customer virtual network 170 to other computer networks. BSA 160 can serve as a communication link between block shadow service 155 and an NVMe agent in smartNIC 165. Communication from the block shadow service 155 can provide information about the target server and the attachment to BSA 160. A connection between the customer virtual network 170 and target fleet 145 can be established by BSA 160. BSA 160 can expose a namespace to the host through host PCIe connection, which can be accessed by the host applications and by the customer through the customer virtual network 170. The customer virtual network 170 can be set up by the VCN, and traffic from customer virtual network 170 can reach extent servers fleet 140 via target fleet 145 through smartNIC 165.

Figure 2:
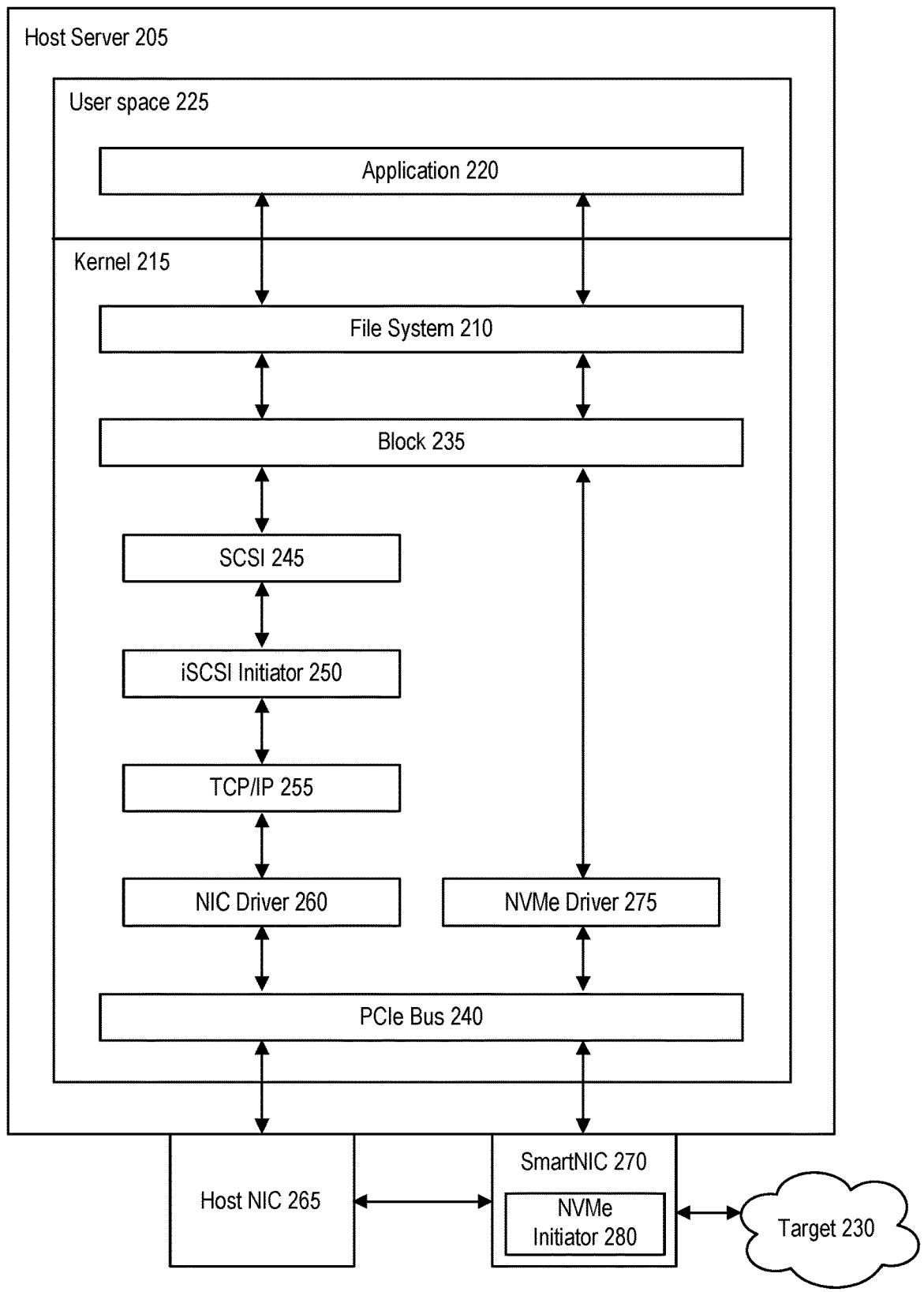
FIG. 2 is a diagram showing a kernel architecture for implementing Internet Small Computer Systems Interface (i SC SI) and Non-Volatile Memory Express (NVMe) attachments, according to an embodiment.

FIG. 2 is a diagram 200 showing a kernel architecture for implementing Internet Small Computer Systems Interface (iSCSI) and Non-Volatile Memory Express (NVMe) attachments according to an embodiment. NVMe and iSCSI are networking protocols providing block-level storage access, and both NVMe and iSCSI can be used to attach BSDP persistent storage. One difference between the two standards is that, in an iSCSI architecture, Input/Output (I/O) requests reach a smartNIC via a host network interface card (NIC), and, in an NVMe architecture, the smartNIC is directly connected to a Peripheral Component Interconnect Express (PCIe) bus. The NVMe kernel stack can be streamlined compared to the iSCSI stack, and NVMe's simplified architecture can be achieved because the NVMe initiator (e.g., initiator 162 of FIG. 1) can be located in the smartNIC 270.

In a host server 205, using either networking protocol, traffic can reach a file system 210 in the kernel 215 from an application 220 in the user space 225. The traffic can be addressed to a target 230 that can be a block storage server (e.g., target fleet 145, extent servers fleet 140, etc.). Traffic for the two standards can follow similar pathways until the traffic arrives at block 235 from file system 210.

Using iSCSI, traffic from block 235 reaches the PCIe bus 240 via SCSI 245, iSCSI initiator 250, TCP/IP 255, and the NIC driver 260. iSCSI traffic leaving PCIe bus 240 can reach the target via host NIC 265 and smartNIC 270. In some instances, PCIe bus 240 can be a serial computer expansion bus. The NVMe pathway can follow a different pathway, and NVMe traffic can reach PCIe bus 240 from block 235 via NVMe driver 275. Instead of passing through host NIC 265, NVMe traffic can travel from PCIe bus 240 to smartNIC 270 before reaching target 230. The NVMe initiator 280 can be located in smartNIC 270 instead of being located in kernel 215 like iSCSI initiator 250.

Figure 3:
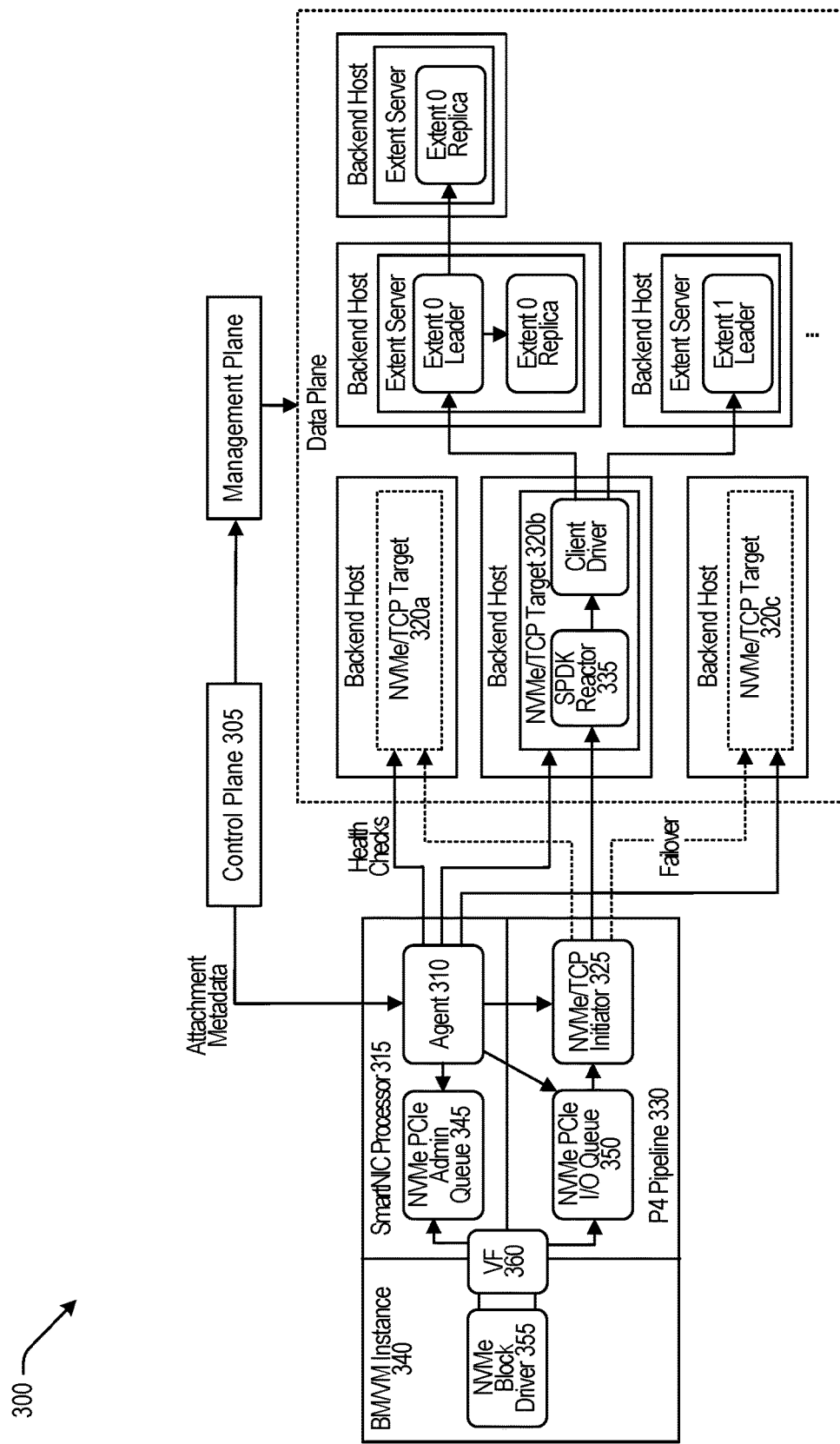
FIG. 3 is a Non-Volatile Memory Express (NVMe) system diagram, according to an embodiment.

FIG. 3 is a Non-Volatile Memory Express (NVMe) system diagram 300 according to an embodiment. A customer, such as customer administrator 105, can initiate an NVMe attachment request from the console or a public API (e.g., API endpoint 110). The NVMe attachment request can be forwarded from the control plane 305 (e.g., block storage control plane 125) to an agent 310 (e.g., BSA 160) in the smartNIC processor 315. The agent 310 can perform health checks on NVMe/TCP targets 320a-320c to identify healthy targets, and agent 310 can instruct the NVMe/TCP initiator 325 in the Programming Protocol-Independent Packet Processors (P4) pipeline 330 to establish a connection with a healthy NVMe/TCP target (e.g., NVMe/TCP target 320b). P4 is a domain-specific programming language that is optimized for controlling packet forwarding. NVMe/TCP initiator 325 can communicate with Storage Performance Development Kit (SPDK) reactor 335 to initiate the connection (e.g., a NVMe/TCP connection). An NVMe/TCP connection refers to a TCP connection with which data provided according to an NVMe protocol that is wrapped/bound to a TCP message-based fabric.

Once a connection is established with NVMe/TCP target 320b and the NVMe attachment is completed, virtual machine/bare metal (VM/BM) instance 340 can issue NVMe admin commands or NVMe I/O commands to the NVMe/TCP target 320b. The NVMe commands can be issued from VM/BM instance 340 to NVMe PCIe admin queue 345 or NVMe PCIe I/O queue 350 via NVMe block driver 355 and virtual function (VF) 360. In some examples, VF 360 can be a PCIe function that supports single root I/O visualization (SR-IOV). In some instances, the admin queue can be used to establish host-controller associations and the queue can support commands like Identify, Get/Set Features, etc. Agent 310 can retrieve NVMe admin commands from the NVMe PCIe admin queue 345 and forward those commands to NVMe/TCP target 320b via a TCP connection using an NVMe specification that maps an NVMe storage access and transport protocol to message-based fabrics using TCP, or the commands can be processed locally. I/O commands received from VM/BM instance 340 can be enqueued into NVMe PCIe I/O queue 350. NVMe block driver 355 (e.g., NVMe driver 275) can retrieve the enqueued commands from NVMe PCIe I/O queue 350 to NVMe/TCP target 320b via NVMe/TCP initiator 325.

Figure 4:
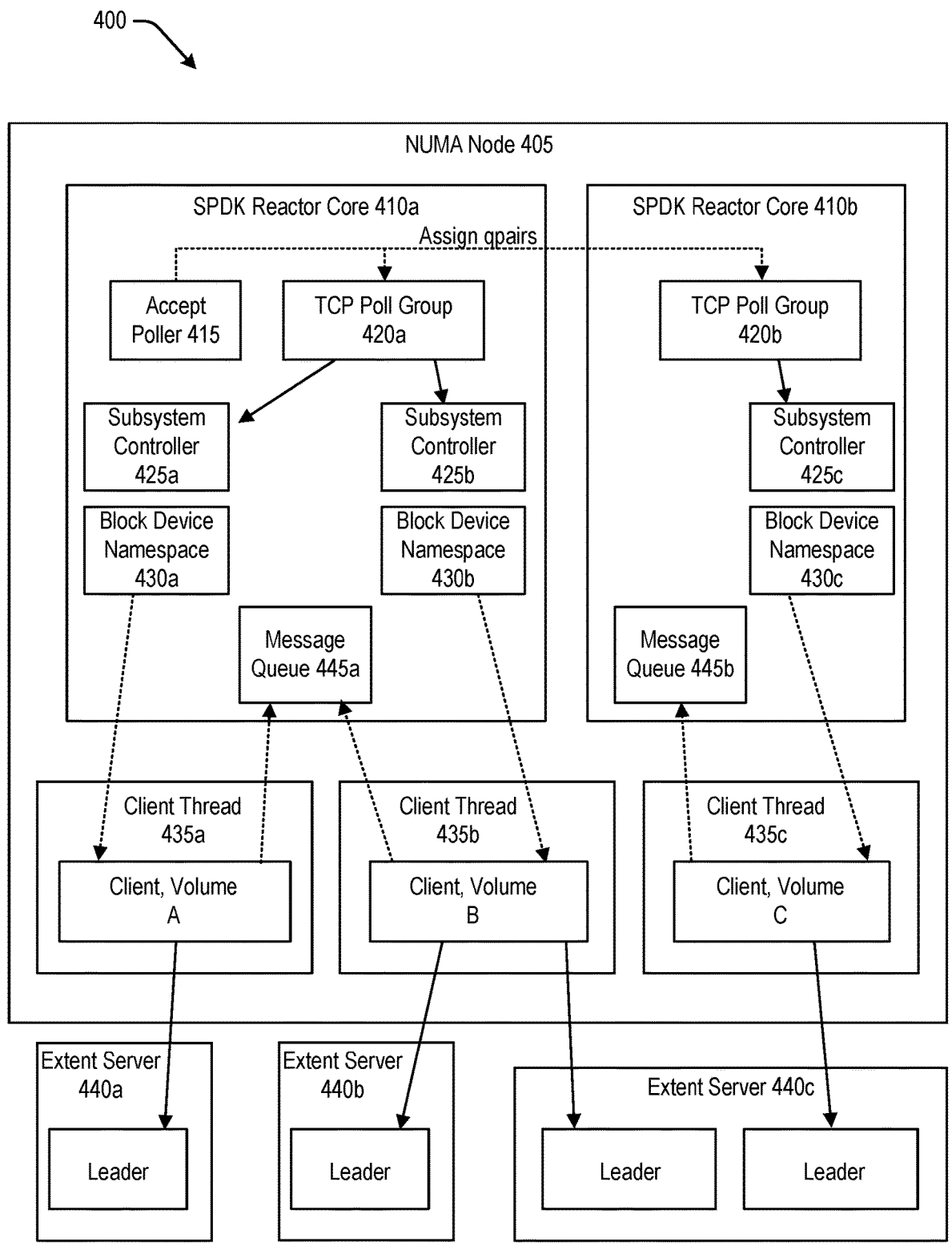
FIG. 4 is a diagram of a Non-Volatile Memory Express (NVMe)/Transmission control Protocol (TCP) target, according to an embodiment.

FIG. 4 is a diagram 400 of a Non-Volatile Memory Express (NVMe)/Transmission Control Protocol (TCP) target according to an embodiment. The NVMe/TCP target (e.g., NVMe/TCP target 320b) can be a Non-Uniform Memory Access (NUMA) node 405 that can include a central processing unit coupled with memory. Cores in the NUMA node 405 CPU can be assigned to one or more SPDK reactor cores such as SPDK reactor cores 410a-410b (e.g., SPDK reactor 335). Accept poller 415 can accept new connections to the SPDK reactor and assign the new connections to a SPDK reactor core (e.g., SPDK reactor core 410a). Accept Poller 415 can assign new connections to an available TCP poll group 420a-b in an available SPDK reactor core 410a-410b, and the new connections can be assigned using a round robin algorithm.

Subsystem controllers 425a-c can be assigned to a new connection, and, for example, subsystem controller 425a can be assigned for a connection made with TCP poll group 420a. More than one subsystem controller 425a-c can be assigned to one of the TCP poll groups 420a-b, and, for instance, subsystem controller 425a and subsystem controller 425b can be assigned to TCP poll group 420a. Block device namespaces 430a-430c can be generated when a connection is made with one of the subsystem controllers 425a-c.

Threads in a NUMA node CPU can be assigned as client threads 435a-c by one of the block device namespaces. Block device namespaces 430a-430c can forward a request that is received through the new connection to one of the client threads 435a-c, and client threads 435a-c can decide which extent server 440a-440c should receive the data associated with the request. After completing the request, client threads 435a-c can send a response to message queue 445a-b to indicate that a request has been completed. Requests can be received at a SPDK reactor core 410a-410b from the smartNIC initiator (e.g., NVMe/TCP initiator 325, NVMe initiator 280, initiator 162, etc.) or a different initiator. Responses can be sent from one of the SPDK reactor cores 410a-410b to the smartNIC initiator or a different initiator.

Figure 5:
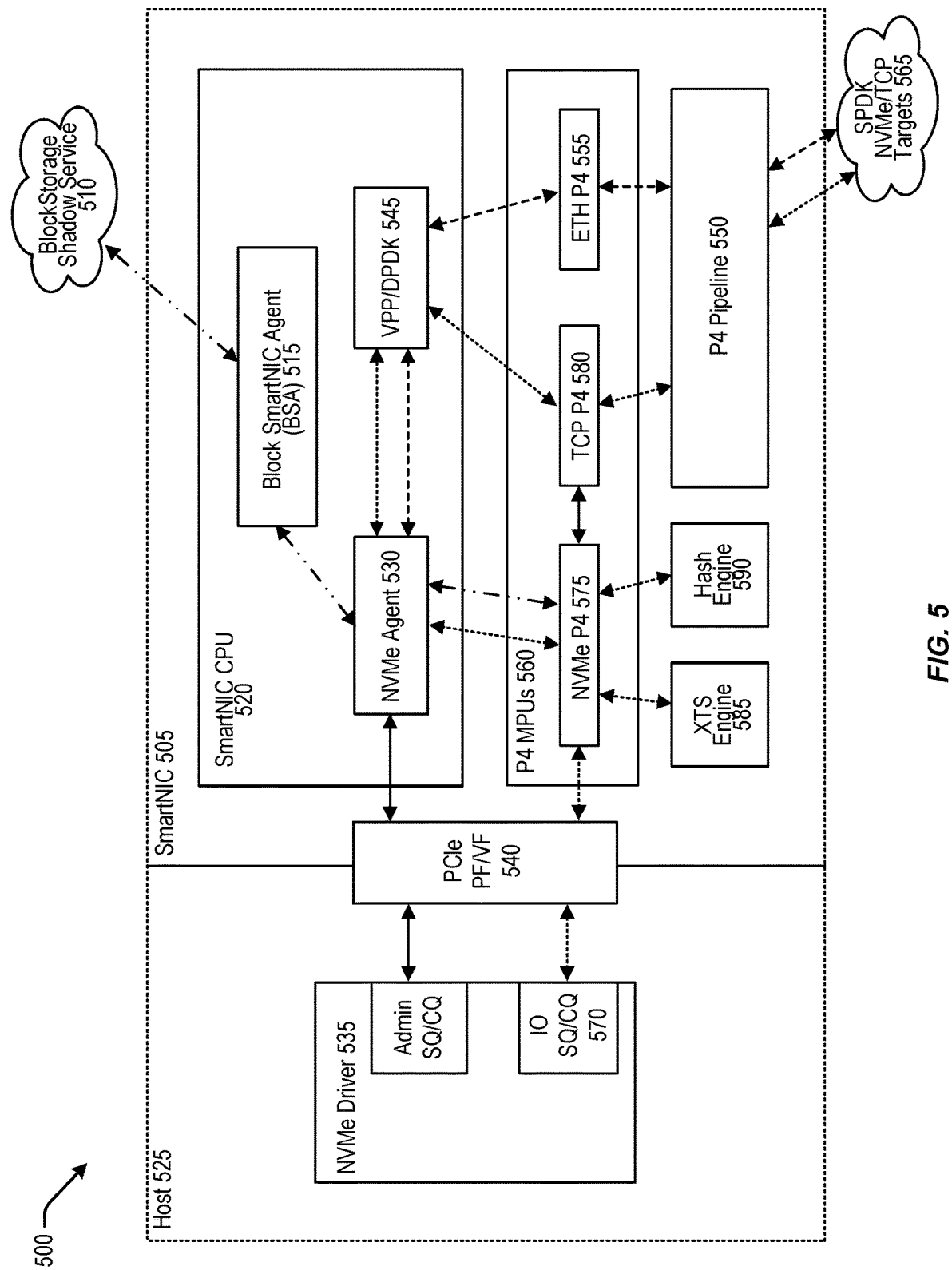
FIG. 5 is a simplified diagram of a smart network interface card (smartNIC) with Non-Volatile Memory Express (NVMe), according to an embodiment.

FIG. 5 is a simplified diagram 500 of a smart network interface card (smartNIC) with Non-Volatile Memory Express (NVMe) according to an embodiment. Requests can be received at smartNIC 505 from the block storage shadow service 510 (e.g., block shadow service 155) in the control plane (e.g., block storage control plane 125, control plane 305, etc.). The requests can be received at the block smartNIC agent (BSA) 515 (e.g., BSA 160) running on the smartNIC central processing unit (CPU) 520. BSA 515 can serve a number of functions including performing health checks, ensuring that targets are available, or performing telemetry. BSA 515 forwards instructions or requests to the host 525, or other smartNIC components, via NVMe Agent 530. Requests or instructions can be sent from NVMe Agent 530 to the NVMe driver 535 via a PCIe physical function or virtual function (PF/VF) 540 (e.g., VF 360).

The NVMe agent 530 can establish a new I/O connection in response to a request from BSA 515 using the vector packet processing/dataplane development kit (VPP/DPDK) module 545. The VPP/DPDK module can use a framework, such as VPP with the DPDK plugin, to process and route network packets. In some embodiments, the VPP/DPDK module can use another suitable packet processing framework or functionality different from the framework or functionality of vector packet processing using the DPDK plugin. Upon receiving a request from NVMe agent 530, VPP/DPDK 545 can send a request to the P4 pipeline 550 (e.g., P4 pipeline 330) via the Ethernet (ETH) P4 module 555 running on the P4 match protection unit (MPU) 560. P4 pipeline 550 can establish an I/O connection with SPDK NVMe/TCP targets 565 (e.g., target 230, target fleet 145, NVMe/TCP target 320a-320c, etc.). Establishing a connection can include sending instructions to NVMe driver 535 or SPDK NVMe/TCP targets 565.

The I/O communication can be offloaded to a fast path I/O pipeline after an I/O connection is established with an SPDK NVMe/TCP target 565. The I/O fast path traffic can travel along the fast path pipeline from the I/O submission queue/completion queue (SQ/CQ) 570 in host 525 to P4 MPUs 560 via PCIe PF/VF 540. I/O traffic can be received in P4 MPUs 560 at NVMe P4 575 and forwarded to the SPDK NVMe/TCP targets 565 via TCP P4 580 and P4 pipeline 550. Traffic in I/O SQ/CQ 570 can start from the submission queue and end at the completion queue when I/O completes. If traffic along the fast path pipeline fails, NVMe P4 575 or TCP P4 580 can inform NVMe Agent 530 of the failure. NVMe agent 530 can be configured so that NVMe agent can create a new I/O connection in response to the failure and offload the new connection to the fast path pipeline. XTS engine 585 is an encryption engine that can encrypt user data using the xor-encrypt-xor (XEX)-based tweaked-codebook mode with ciphertext stealing (XTS) block cypher, and hash engine 590 can use cryptographic hash functions to verify data integrity.

Figure 6:
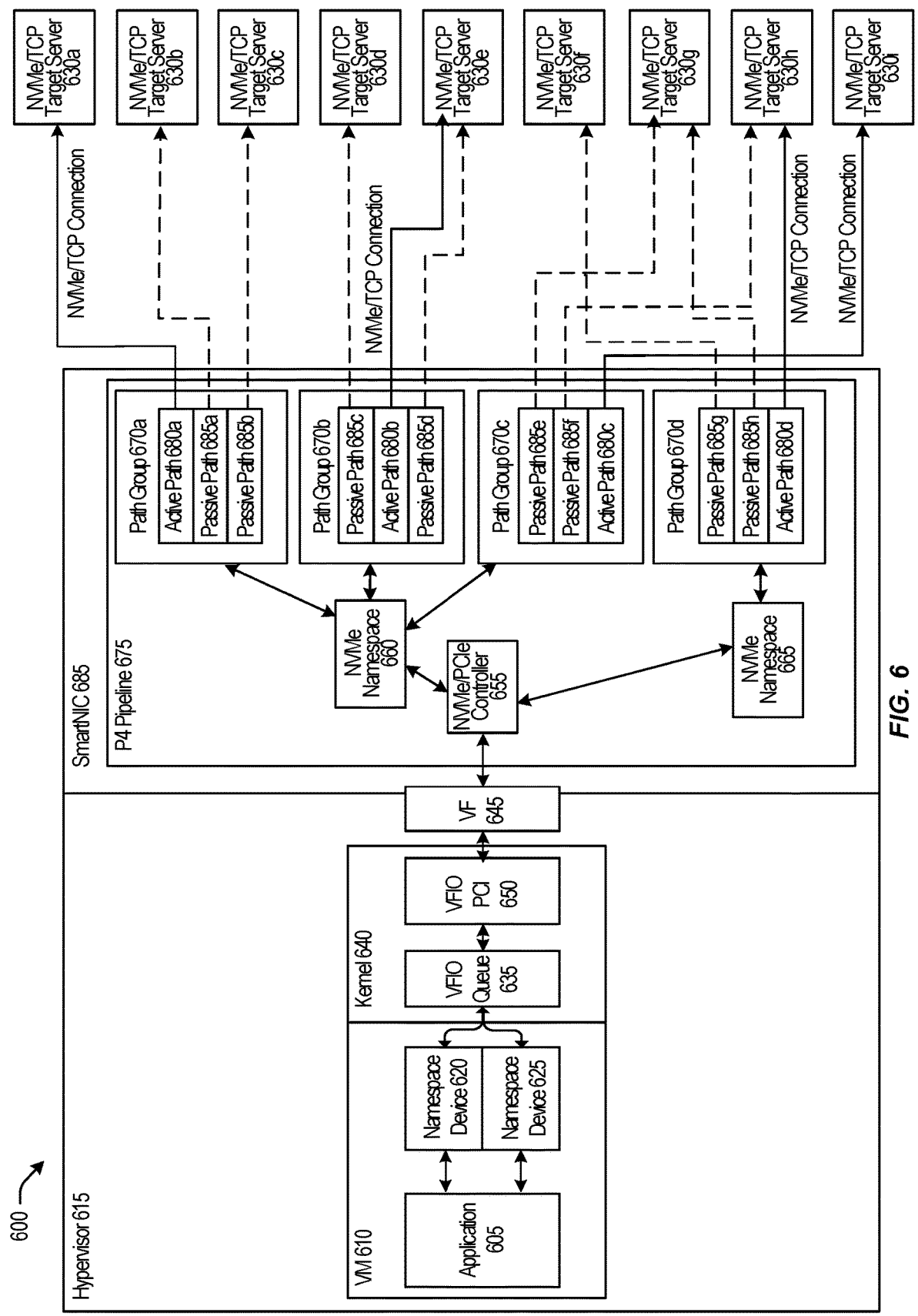
FIG. 6 is a diagram showing multipath handling in a smart network interface card (smartNIC), according to an embodiment.

FIG. 6 is a diagram 600 showing multipath handling in a smart network interface card (smartNIC) according to an embodiment. An application 605 can run in a virtual machine (VM) 610 managed by a hypervisor 615. Application 605 can be similar to application 220, and VM 610 can be a bare metal machine (e.g., VM/BM instance 340). Two namespace devices, namespace device 620 and namespace device 625, can be associated with Application 605. A namespace can be a NVM storage that is formatted for block access. A namespace can be analogous to a logical unit in SCSI, and a block storage volume can be a single namespace. Traffic between namespace device 620 or namespace device 625 and the NVMe/TCP target servers 630a-i (e.g., target server 150) can be received via the virtual function Input/Output queue (VFIO) 635 in the kernel 640. The virtual function (VF) 645 can be connected to VFIO queue 635 via the VFIO peripheral component interconnect (PCI) 650. VF 645 can be a virtual function or a physical function.

The NVMe/PCIe controller 655 (e.g., NVMe P4 1575) can route traffic from the namespace devices 620 and 625 to NVMe namespaces. For instance, traffic can be routed between namespace device 620 and NVMe namespace 660, and traffic can be routed between namespace device 625 and NVMe namespace 665. The NVMe namespaces can be associated with one or more path groups 670a-d located in the P4 pipeline 675 (e.g., P4 pipeline 550, P4 MPUs 560, etc.) in smartNIC 680 (e.g., smartNIC 165, smartNIC 270, smartNIC 505, etc.). For instance, NVMe namespace 660 can route traffic to path groups 670a-670c, and NVMe namespace 665 can route traffic to path group 670d.

Path groups can include an active path 680a-d and one or more passive paths 685a-685h. Active paths 680a-d or passive paths 685a-685h can be associated with a NVMe/TCP target server 630a-i. Traffic between a NVMe/TCP target server 630a-i and namespace device 620 or namespace device 625 can be routed via active paths 680a-d. NVMe/TCP target servers 630a-i can route traffic to and from extent servers (e.g., extent servers fleet 140, extent servers 440a-440c, etc.).

Traffic can be routed via a passive path 685a-685h if an active path 680a-d fails. In response to a failure, data associated with passive path 685a-685h can be used (e.g., NVMe Agent 530, initiator 162, etc.) to login to an extent server via NVMe/TCP target servers 630a-630h. The extent server can change a token from the token associated with an active path 680a-d to a token associated with a passive path 685a-685h. The extent server can use the token to determine whether to accept traffic from a path (e.g., active paths 680a-d or passive paths 685a-685h).

Figure 7:
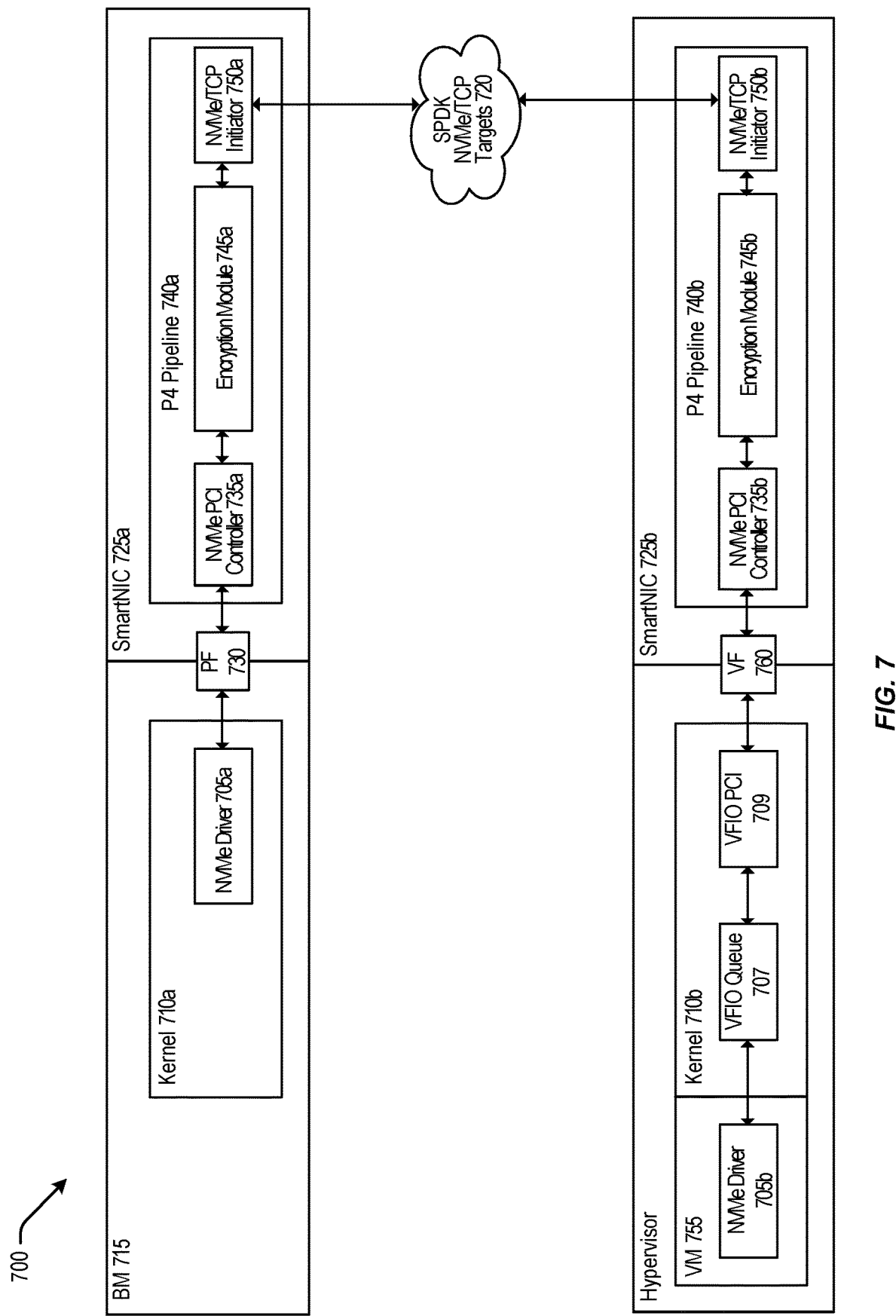
FIG. 7 shows a diagram of an architecture for performing encryption/decryption with a smart network interface card (smartNIC), according to an embodiment.

FIG. 7 shows a diagram of an architecture 700 for performing encryption/decryption with a smart network interface card (smartNIC) according to an embodiment. The architecture 700 can provide a unified means for encrypting/decrypting both VM and BM traffic. NVMe driver 705a (e.g., NVMe driver 275) can run in the kernel 710a of a bare metal (BM) machine 715 (e.g., VM/BM instance 340, etc.). Traffic can be sent from NVMe driver to SPDK NVMe/TCP targets 720 via smartNIC 725*a*. The BM traffic can be received via a physical function (PF) 730 (e.g., PCIe PF/VF 540, etc.) at the NVMe PCI controller 735*a* (e.g., NVMe/ PCIe controller 655, NVMe P4 575, etc.) in the P4 pipeline 740*a* (e.g., P4 MPUs 560, P4 pipeline 550, etc.).

Outgoing BM traffic traveling from NVMe driver 705*a* to SPDK NVMe/TCP targets 720 can be encrypted by the encryption module 745*a* in smartNIC 725*a*, and incoming BM traffic can be decrypted by the encryption module 745*a*. Encryption module 745*a* can encrypt or decrypt traffic using an encryption algorithm such as Advanced Encryption Standard (AES). The encrypted BM traffic can be sent to SPDK NVMe/TCP targets 720 via the NVMe/TCP initiator 750*a* (e.g., NVMe initiator 280, NVMe/TCP initiator 325, NVMe Agent 530, etc.). Incoming encrypted BM traffic from SPDK NVMe/TCP targets 720 can be received at NVMe/TCP initiator 750*a* before being forwarded along the pathway to NVMe driver 705*a*. Incoming encrypted BM traffic can be decrypted by the encryption module 745*a*.

Outgoing VM traffic can be sent from NVMe driver 705*b* in the virtual machine (VM) 755 (e.g., VM/BM instance 340, VM 610, etc.) to the virtual function Input/Output (VFIO) Queue 707 (e.g., VFIO Queue 635) in kernel 710*b* and on to a virtual function (VF) 760 (e.g., VF 360, VF 645, etc.) via a VFIO PCI 709 (e.g., VFIO PCI 650). The outgoing VM traffic can be forwarded to NVMe PCI controller 735*b* (e.g., NVMe/PCIe controller 655, NVMe P4 575, etc.) in the P4 pipeline 740*b* (e.g., P4 MPUs 560, P4 pipeline 550, etc.). The outgoing VM traffic can be forwarded from smartNIC 725*b* to SPDK NVMe/TCP targets 720 via encryption module 745*b* and NVMe/TCP initiator 750*b* (e.g., NVMe initiator 280, NVMe/TCP initiator 325, NVMe Agent 530, etc.). Incoming VM traffic from SPDK NVMe/TCP targets 720 can be received at NVMe/TCP initiator 750*b* (e.g., NVMe initiator 280, NVMe/TCP initiator 325, NVMe Agent 530, etc.) before the incoming traffic is forwarded along the pathway to NVMe driver 705*b*. Incoming encrypted VM traffic can be decrypted by the encryption module 745*a*.

Load-Based NMVe Over TCP Connection Management

Figure 8:
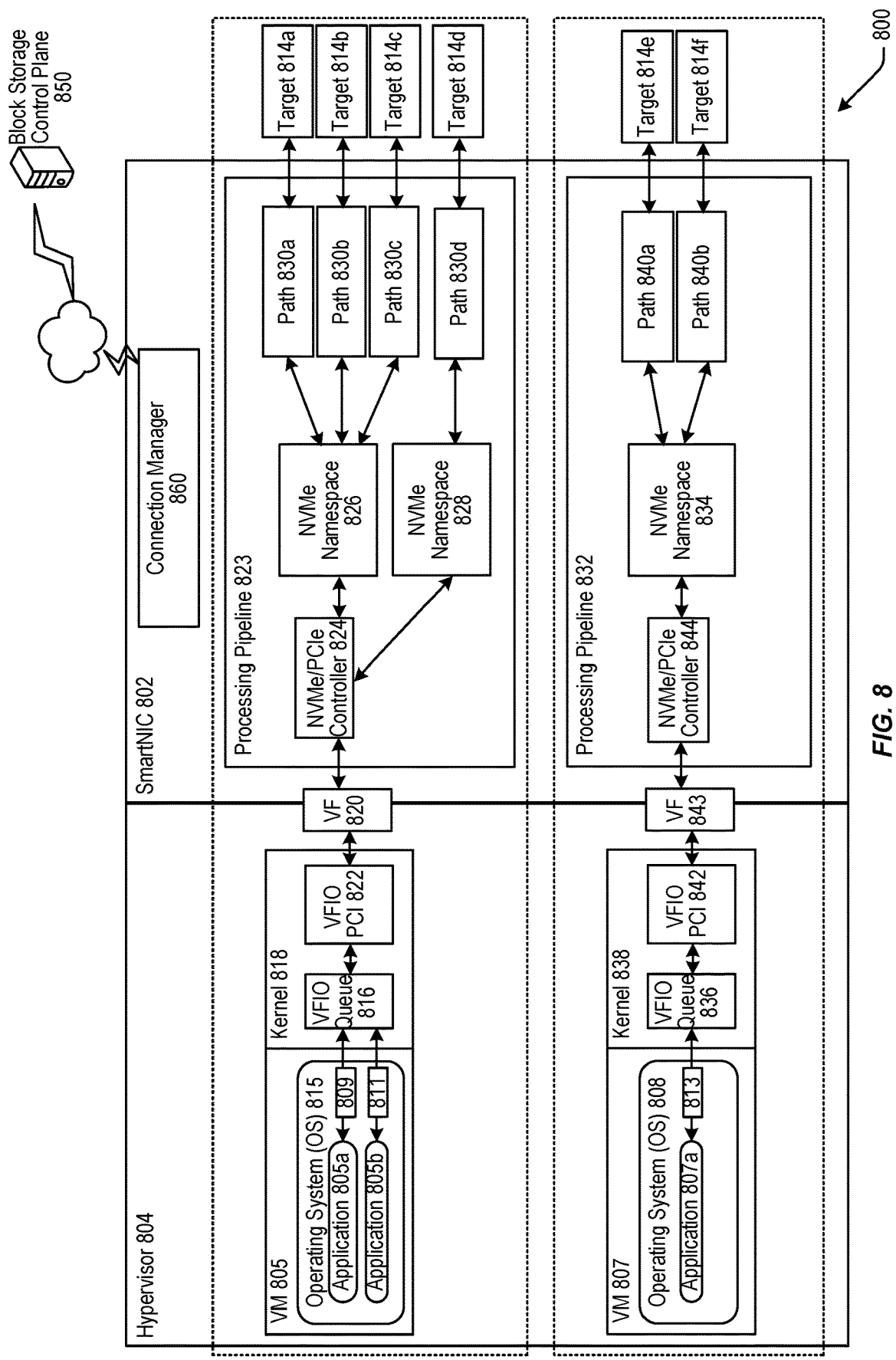
FIG. 8 is a diagram of another example showing multipath handling in a smart network interface card (smartNIC), according to an embodiment.

FIG. 8 is a diagram 800 showing another example of multipath handling in a smart network interface card (smartNIC) 802 (e.g., smartNIC 685 of FIG. 6), according to an embodiment. The smartNIC 802 may be part of a host machine (not depicted) of a cloud computing environment on which hypervisor 804 executes. Hypervisor 804 may be configured to manage one or more virtual machines (e.g., VM 805 and VM 807) hosted by the host machine. Each VM may be a virtual machine, or bare metal instances can be similarly applied to the examples provided herein. One or more applications can run at each of the VMs (e.g., VM 805 and VM 807) at an operating system of the VM. By way of example, applications 805*a* and 805*b* may execute within operating system (OS) 806 at VM 805 and application 807*a* may execute within OS 808 at VM 807. Applications 805*a*, 805*b*, and 807*a* can be similar to application 220, 605, etc. VM 805 and applications 805*a* and 805*b* may be associated with a particular tenant/customer of a cloud computing environment while VM 807 and application 807*a* may be associated with the same or different tenant/customer. Applications 805*a*, 805*b*, and 807*a* may be configured to send and receive data to and from a corresponding block storage data plane (B SDP) component. For example, application 805*a* may be configured to transmit and receive data through processing pipeline 823 to a BSDP volume associated with a first namespace. Likewise, application 807*b* may be configured to transmit and receive data through processing pipeline 823 to a BSDP volume associated with a second namespace.

Namespace device 809 and namespace device 811, which are examples of namespace device 620 and namespace device 625, can be associated with each application (e.g., application 805*a* and 805*b*, respectively). Likewise, namespace device 813 may be associated with application 807*a*. A namespace may be associated with a non-volatile memory (NVM) storage that is formatted for block access. By way of example, a given namespace may be associated with a particular block storage volume of a block storage data plane of a cloud computing environment (e.g., the block storage data plane (BSDP) of FIG. 1 including extent servers fleet 140, one or more of which may be configured to provide a block storage volume/persistent storage within the BSDP). A namespace can be analogous to a logical unit in SCSI, and a block storage volume can be associated with a single namespace. Traffic may be routed along the path from application 805*a*, through namespace device 809, to NVMe namespace 826 and on to NVMe/TCP target servers associated with the same namespace (e.g., targets 814*a-d*, examples of the target fleet 145). Each of the targets 814*a-d* may serve as an endpoint that manages data receipt and/or transmissions that utilize TCP connections that are associated with the same namespace. In some embodiments, each of targets 814*a-d* are configured to receive data from a single and unique path for which the other endpoint corresponds to a unique IP address associated with the smartNIC. Data received from the applications may be provided to the virtual function Input/Output queue (VFIO) 816 (e.g., the VFIO 635) in kernel 818 (an example of kernel 640). The virtual function (VF) 820 (an example of VF 645) may be connected to VFIO queue 816 via the VFIO peripheral component interconnect (PCI) 822 (an example of the VFIO PCI 650). VF 820 can be a virtual function or a physical function.

Processing pipeline 823 may include NVMe/PCIe controller 824, NVMe namespaces 826 and 828, and paths 830*a-d*. The NVMe/PCIe controller 824 (an example of NVMe P4 1575, NVMe/PCIe controller 655, etc.) may route traffic from the namespace devices 809 and 811 to NVMe namespaces 826 and 828, respectively. For instance, traffic can be routed between namespace device 809 and NVMe namespace 826, and traffic can be routed between namespace device 811 and NVMe namespace 828. The NVMe namespaces can be associated with one or more paths (e.g., paths 830*a-d*, collectively referred to as "paths 830"). Each path 830*a-d* may correspond to one or more active or passive network paths ("active paths" or "passive paths," for brevity). Each of the paths 830 may include a single active path. Each of the paths 830 may be individually associated with a unique IP address assigned to the smartNIC. Each smartNIC IP address for a given path (path 830*a*) may differ from the smartNIC IP addresses used for the other paths (paths 830*b-d*) of paths 830.

The paths 830*a-d* may individually be associated with a namespace corresponding to a particular BSDP volume (e.g., BSDP persistent storage). As depicted, paths 830*a-c* are associated with a namespace with which targets 814*a-c* are also associated (e.g., NVMe namespace 826). As another example, path 830*d* may be associated with a namespace with which target 814*d* is associated (e.g., NVMe namespace 828). Targets 814*a-c* may receive data via paths 830*a-c* intended for a particular BSDP volume/persistent storage. Targets 814*a-c* may transmit data from the BSDP volume/persistent storage along paths 830a-c to ultimately provide data to application 805a. Similarly, target 814d may receive data via path 830d intended for another BSDP volume/persistent storage. Target 814d may transmit data from the BSDP volume/persistent storage along path 830d to ultimately provide data to application 805b.

As another example, application 807a may be configured to transmit and receive data through processing pipeline 832 to a BSDP volume associated with a third namespace. Namespace device 813, which is an examples of namespace device 620 and/or namespace device 625, can be associated with each application (e.g., application 805a and 805b, respectively) may be associated with application 807a and a particular block storage volume of a block storage data plane of a cloud computing environment associated with the third namespace. Network traffic may be routed along the path from application 807a, through namespace device 813, to NVMe namespace 834 and on to NVMe/TCP target servers associated with the same namespace (e.g., targets 814e-f, examples of the target fleet 145). Each of the targets 814e-f may serve as an endpoint that manages data receipt and/or transmissions that utilize TCP connections that are associated with the same namespace. In some embodiments, each of targets 814e-f are configured to receive data from a single and unique path for which the other endpoint corresponds to a unique IP address associated with the smartNIC. Data received from the applications may be provided to the virtual function Input/Output queue (VFIO) 836 (e.g., the VFIO 635) in kernel 838 (an example of kernel 640). The virtual function (VF) 843 (an example of VF 645) may be connected to VFIO queue 836 via the VFIO peripheral component interconnect (PCI) 842 (an example of the VFIO PCI 650). VF 8463 can be a virtual function or a physical function.

Processing pipeline 832 may include NVMe/PCIe controller 844, NVMe namespace 834, and paths 840a-b. The NVMe/PCIe controller 855 (an example of NVMe P4 1575, NVMe/PCIe controller 655, etc.) may route traffic from the namespace device 813 to NVMe namespace 834. The NVMe namespaces can be associated with one or more paths (e.g., paths 840a-b, collectively referred to as "paths 840"). Each path 840 may correspond to one or more active or passive network paths ("active paths" or "passive paths," for brevity). Each of the paths 840 may include a single active path. Each of the paths 840 may be individually associated with a unique IP address assigned to the smartNIC. Each smartNIC IP address for a given path (path 840a) may differ from the smartNIC IP addresses used for the other paths (path 840b) of paths 840.

The paths 840 may individually be associated with a namespace corresponding to a particular BSDP volume (e.g., BSDP persistent storage). As depicted, paths 840a-b are associated with a namespace with which targets 814e-f are also associated (e.g., NVMe namespace 834). Targets 814e-f may receive data via paths 840 intended for a particular BSDP volume/persistent storage. Targets 814e-f may transmit data from the BSDP volume/persistent storage along paths 840 to ultimately provide data to application 807a.

The number of paths corresponding to a particular BSDP volume/persistent storage may be identified based at least in part on a performance threshold associated with the B SDP volume/persistent storage. By way of example a particular BSDP volume may be associated with a performance threshold that indicates the BSDP volume can process up to 2 million input/output operations per second (IOPS). Each of the paths 830 and 840 may be associated with a performance capability indicating the maximum IOPS each path can sustain. In some embodiments, the performance capability of a path is the same for every path (e.g., 60,000 IOPS). In some embodiments, block storage control plane 850 (an example of the block storage control plane 125) may be configured to identify a total number of active paths of a given performance capability (60,000 IOPS) needed to meet the performance threshold associated with the BSDP volume (2 million IOPS). The particular number of paths 830 and 840 depicted in FIG. 8 is not intended to limit the scope of this disclosure. A greater or fewer number of paths may be utilized.

SmartNIC 802 may include connection manager 860. Connection manager 860 may be an example of BSA 160, agent 310, BSA 515, etc. The connection manager 860 may be a software agent executed by the processor(s) of Smart-NIC 802 (e.g., smartNIC CPU 520). The connection manager 860 may be configured to manage initiating paths 830 and 840 according to configuration information (e.g., attachment metadata of FIG. 3) received from the block storage control plane 850 (e.g., control plane 305). This configuration information may include any suitable data for establishing TCP connections (e.g., the NVMe/TCP connections of FIG. 6) to various targets (e.g., target servers serving as endpoints for various corresponding block storage data plane volumes/persistent storages. By way of example, the configuration information may specify, for each path, an IP address associated with the smartNIC 802 and an IP address corresponding to a target server (e.g., one of targets 814). In some embodiments, the configuration information may specify whether the TCP connection corresponding to each path is to be active (e.g., established and utilized) or passive. If passive, the configuration information with which a TCP connection may be established for that path may be stored, but the TCP connection may not be established until an indication is received from the connection manager 860 indicating that the path should be made active. The connection manager 860 may be configured to communicate any suitable portion of the configuration information (e.g., configuration information corresponding to active paths only, configuration information for any active/passive path, etc.) to a NVM initiator (e.g., initiator 162, NVMe initiator 280, etc., not depicted here) that may be configured to manage (e.g., store) that configuration information and/or establish or terminate corresponding TCP connections according to the configuration information. NVMe Agent 530 and/or VPP/DPDK 545 may operate as part of the NVMe initiator. The NVMe initiator may employ the process by which TCP connections are established as discussed in connection with FIG. 5 to establish the TCP connections between paths 830 and 840 and corresponding targets (e.g., targets 814). NVMe/TCP initiator 925 may utilize NVMe Agent 530 and/or VPP/DPDK 545 to terminate NVMe/TCP connections as instructed by connection manager 940.

Conventionally, the number of established connections would remain fixed at runtime. However, maintaining unnecessary TCP connections wastes memory and processing resources of the smartNIC 802. Therefore, in some embodiments, connection manager 860 may be configured to obtain network traffic information (e.g., from NVMe/PCIe Controllers 824 and/or 842, from NVMe namespaces 826, 828, and/or 834). In some embodiments, NVMe/PCIe Controllers 824 and/or 842, or NVMe namespaces 826, 828, and/or 834 may be configured to provide information regarding the network traffic (e.g., network traffic data) to connection manager 860 according to any suitable frequency or schedule. In some embodiments, the connection manager 860 may be configured to request information associated with the network traffic or the network traffic itself from the any suitable combination of NVMe/PCIe Controllers 824 and/or 842, and/or NVMe namespaces 826, 828, and/or 834.

Connection manager 860 may be configured to identify input/output operations of the network traffic data (e.g., data indicating the network traffic is associated with an I/O operation, the data payload of the network traffic, the network traffic itself) obtained. The number of input/output operations corresponding to a given namespace or path may be identified over a period of time. In some embodiments, the connection manager 860 may identify a data payload size corresponding to the network traffic from the network traffic data obtained and may calculate a throughput value for the path(s) corresponding to a given BSDP volume/ persistent storage and/or namespace. The connection manager 860 may compare the computed throughput value to a performance threshold associated with those paths. The performance threshold may be identified based at least in part on aggregating the performance capability of every active path associated with the BSDP volume/persistent storage or corresponding namespace. The connection manager 860 may determine, through comparing the throughput value corresponding to current network traffic to the performance threshold. The connection manager 860 may monitor the difference between the current throughput of the network traffic and the performance threshold over time.

In some embodiments, when the connection manager 860 identifies that the current throughput of the network traffic has fallen below the performance threshold for a threshold period of time, a process for deactivating additional paths may be triggered. Deactivating a path may include transmitting data to the NVMe initiator to cause the NVMe initiator to terminate one or more previously established TCP connections. In some cases, the connection manager 860 may trigger this deactivation process when the network traffic has fallen below the performance threshold corresponding to the active paths associated with a given BSDP volume or namespace by at least a threshold amount (e.g., by at least the amount of IOPs corresponding to a path such as 60,000 IOPS in the example given above). In some embodiments, the NVMe initiator may be instructed to terminate one TCP connection at a time, or the NVMe initiator may be instructed by the connection manager 860 to deactivate more than one TCP connection. When deactivation of a previously active path is performed, the performance threshold associated with the number of currently active paths may be adjusted accordingly (e.g., set to a value that corresponds to an aggregate number of IOPs for the collective paths associated with a given BSDP volume or namespace).

Monitoring the network traffic may be ongoing. At any suitable time, the connection manager 860 may identify that the current throughput of the network traffic has breached the current performance threshold for a threshold period of time, a process for activating additional paths may be triggered. Activating a path may include transmitting data to the NVMe initiator to cause the NVMe initiator to perform a process for establishing one or more additional TCP connections corresponding to one or more previously passive paths (e.g., paths for which a TCP connection is not currently established). In some embodiments, the NVMe initiator may be instructed to activate (e.g., establish) one TCP connection at a time, or the NVMe initiator may be instructed by the connection manager 860 to activate/establish more than one TCP connection at a time. When a new TCP connection path is made (or reactivated/reestablished), the performance threshold associated with the number of currently active paths may be adjusted accordingly (e.g., set to a value that corresponds to the new aggregate number of IOPs for the collective paths associated with a given BSDP volume or namespace).

This process may be performed on an ongoing basis enabling the connection manager 860 to dynamically adjust the number of established TCP connections used for a given BSDP volume or namespace. These techniques provide improvements over conventional methods by enabling the TCP connections utilized for a given BSDP volume or namespace to be dynamically modified (e.g., increased or decreased) to more closely match the network traffic experienced at run time. When the network traffic increases, the number of established TCP connections corresponding to active paths may be increased. When the network traffic decreases, the number of established TCP connections corresponding to the active paths for a B SDP volume or namespace may be decreased. This reduces the memory and CPU usage at the smartNIC 802 that was previously wasted through managing unnecessary or underutilized TCP connections when the number of established TCP connections exceeded the number needed to handle the current network traffic throughput.

Figure 9:
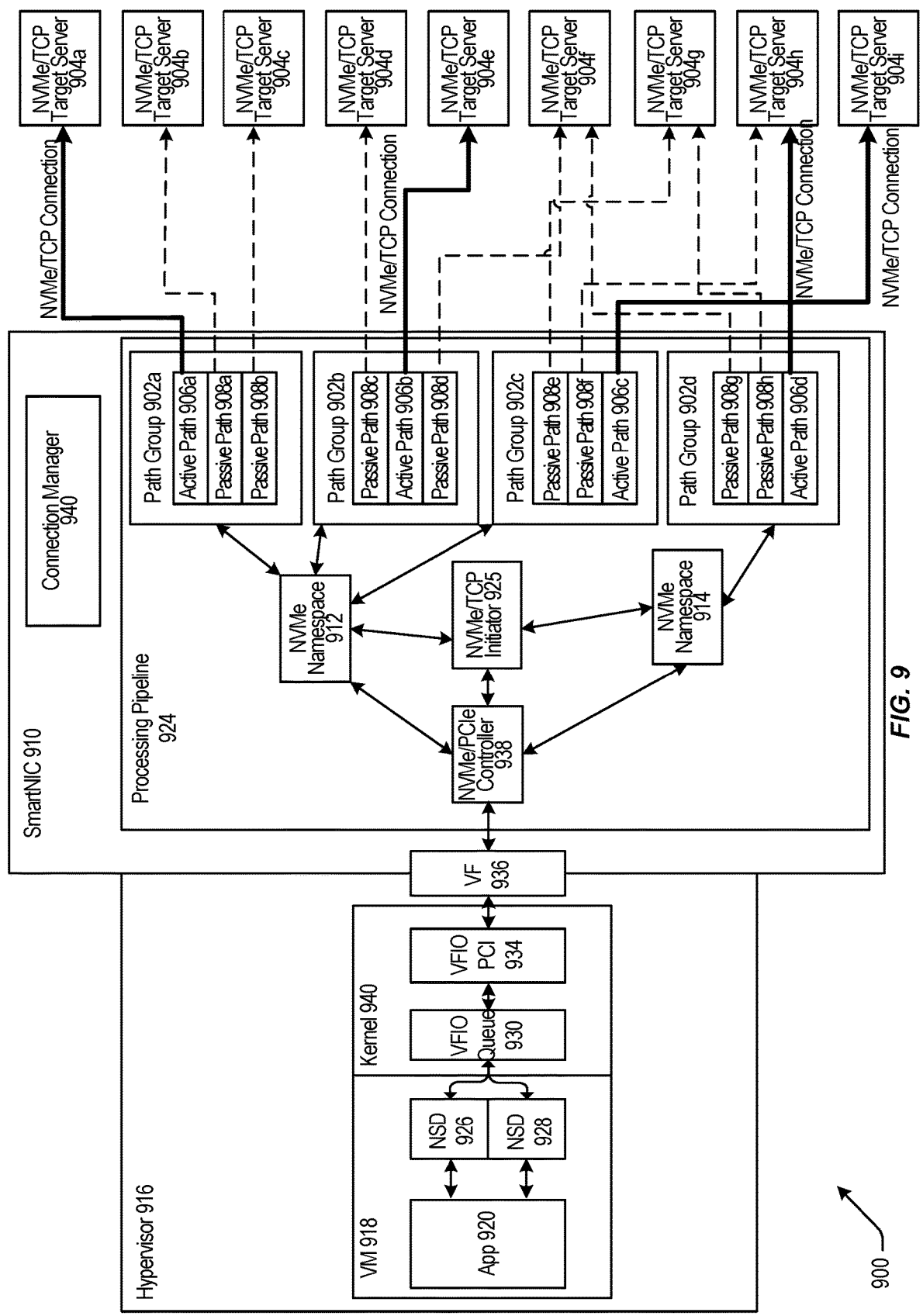
FIG. 9 is a diagram of yet another example showing multipath handling in a smart network interface card (smartNIC), according to an embodiment.

FIG. 9 is a diagram 900 of yet another example showing multipath handling in a smart network interface card (smartNIC), according to an embodiment. The example of FIG. 9 is intended to depict a use case in which a number of path groups are utilized. Each path group (e.g., path group 902a-d) may include any suitable number of active and passive paths. An active path (e.g., active paths 906a-d) may correspond to a TCP connection to an NVMe/TCP target server (e.g., NVMe/TCP target servers 904a-i, each an example of the targets 814, NVMe/TCP target servers 630a-i, etc.), the TCP connection being one that is already established or is soon to be established based on its association to an active path. Each path group may include any suitable number of passive paths (e.g., passive paths 908a-h). A passive path may be associated with configuration information with which a TCP connection may be later established. However, TCP connections may not be established for paths while they are designated as being passive. Each passive path and the corresponding configuration information may be utilized during a failover procedure when it is determined that the TCP connection associated with a corresponding active path is compromised. By way of example, a TCP connection corresponding to active path 906a may be established and maintained between an IP address of the smartNIC 910 (e.g., the smartNIC 802) and NVMe/TCP target server 904a. While the NVMe/TCP connection corresponding to active path 906a is operational/ established, the configuration information for establishing TCP connections corresponding to passive paths 908a and 908b (e.g., the passive paths associated with the same path group, here, path group 902a) may be stored but unutilized. While the NVMe/TCP connection associated with the active path 906a is utilized and uncompromised, no TCP connections may be established for the passive paths 908a and 908b. At any suitable time, if the active path 906a is determined to be compromised (e.g., a threshold number of network packets have been dropped, a last time a network packet was transmitted or received by the smartNIC 910 or NVMe/TCP target server 904a has exceeded a predetermined threshold period of time, the NVMe/TCP connection has been lost, etc.), one of the passive paths (e.g., passive path 908a) may be activated to take become the active path. The TCP connection for active path 906a, if still established, may be terminated and the configuration information corresponding to that TCP connection may be maintained at the smartNIC 910. The active path 906*a* may be designated as being a passive path and the passive path 908*a*, now having an established NVMe/TCP connection to NVMe/TCP target server 904*b*, a target server associated with the same BSDP volume and/or namespace as NVMe/TCP target server 904*a*, may be designated/associated with an indicator indicating the passive path 908*a* is now the active path (e.g., for path group 902*a*).

Each path group and the corresponding active/passive paths may be associated with a common namespace. Multiple path groups may correspond to a common namespace. For example, path groups 902*a-c* and the corresponding active/passive paths of those path groups may correspond to NVMe namespace 912, while path group 902*d* and its corresponding active/passive paths may correspond to NVMe namespace 914.

The components of FIG. 9 may generally correspond to the components described in connection with FIG. 8. For example, Hypervisor 916 may be an example of Hypervisor 804 and may be configured to manage one or more virtual machines (e.g., VM 918, an example of VMs 805 and/or 807) hosted by the host machine. VM 918 may be a virtual machine, or bare metal instance. Application 920 (e.g., an example of the applications 805*a*, 805*b*, 807*a*) may run at a VM 918. Application 920 may execute within operating system (OS) 922 (an example of the OS 815). VM 918 may be associated with a particular tenant/customer of a cloud computing environment. Application 920 may be configured to send and receive data to and from a corresponding block storage data plane (BSDP) component. For example, application 920 may be configured to transmit and receive data through processing pipeline 924 to a BSDP volume associated with a first namespace.

Namespace device 926 and namespace device 928 (examples of namespace devices 809 and 811), can be associated with application 920. The namespace may be associated with a particular block storage volume of a block storage data plane of a cloud computing environment (e.g., the block storage data plane (BSDP) of FIG. 1 including extent servers fleet 140, one or more of which may be configured to provide a block storage volume/persistent storage within the BSDP). Network traffic may be routed along the path from application 920, through namespace device 926, to NVMe namespace 912 and on to NVMe/TCP target servers associated with the same namespace (e.g., the NVMe/TCP target servers of 914*a-i* that correspond to active paths 906*a-d*, examples of the target fleet 145). Any suitable combination of the targets 914*a-i* may serve as an endpoint that manages data receipt and/or transmissions that utilize TCP connections that are associated with the same namespace. By way of example, NVMe/TCP target servers 904*a*, 904*e*, and 904*i* may be associated with the same namespace as the path groups 902*a-c* and the active/passive paths of each of those path groups. In some embodiments, each of NVMe/TCP target servers 904*a*, 904*e*, and 904*i* are configured to receive data from a single and unique path for which the other endpoint corresponds to a unique IP address associated with the smartNIC. By way of example, NVMe/TCP target servers 904*a* may be configured to receive transmit data through a TCP connection with the smartNIC 910 that corresponds the IP address associated with active path 906*a*. Similarly, NVMe/TCP target server 904*e* may be configured to receive/transmit data from/to the smartNIC 910 using a TCP connection corresponding to active path 906*b*. As another example, NVMe/TCP target server 904*i* may be configured to receive/transmit data from/to the smartNIC 910 using a TCP connection corresponding to active path 906*c*. Data received from the application 920 may be provided to the virtual function Input/Output (VFIO) queue 930 (e.g., the VFIO Queue 816, VFIO Queue 635) in kernel 818 (an example of kernel 640). The virtual function (VF) 936 (an example of VF 820, VF 645) may be connected to VFIO queue 930 via the VFIO peripheral component interconnect (PCI) 934 (an example of the VFIO PCI 822, VFIO PCI 650). VF 936 can be a virtual function or a physical function.

Processing pipeline 924 may include NVMe/PCIe controller 938, NVMe namespaces 912 and 914, and in some embodiments, NVMe/TCP initiator 925 (e.g., initiator 162, NVMe initiator 280), and path groups 902*a-d* that individually include respective sets of active/passive paths 906/908, as depicted. The NVMe/PCIe controller 938 (an example of NVMe/PCIe controller 824, NVMe P4 1575, NVMe/PCIe controller 655, etc.) may route traffic from the namespace devices 926 and 928 to NVMe namespaces 912 and 914, respectively. For instance, traffic can be routed between namespace device 926 and NVMe namespace 912, and traffic can be routed between namespace device 928 and NVMe namespace 914 along the active path associated with a corresponding path group. By way of example, network traffic can be routed via NVMe namespace 912 through a NVMe/TCP connection corresponding to one of active paths 906*a*, 906*b*, or 906*c* and on to one of NVMe/TCP target servers 904*a*, 904*e*, or 904*i*, depending on the active path and corresponding NVMe/TCP connection utilized. Likewise, network traffic for NVMe namespace 914 may be routed through a NVMe/TCP connection corresponding to active path 806*d* to NVMe/TCP target server 904*h*.

SmartNIC 910 may include connection manager 940. Connection manager 940 may be an example of connection manager 860, BSA 160, agent 310, BSA 515, etc. The connection manager 940 may be a software agent executed by the processor(s) of SmartNIC 802 (e.g., smartNIC CPU 520). The connection manager 940 may be configured to manage paths 906 and 908 according to the path groups 902 to which those paths are associated (e.g., according to configuration information (e.g., attachment metadata of FIG. 3) received from the block storage control plane 850 (e.g., control plane 305), not depicted here). The configuration information may specify, for each path, an IP address associated with the smartNIC 802 and an IP address corresponding to a target server (e.g., one of NVMe/TCP target servers 904). In some embodiments, the configuration information may specify whether the TCP connection corresponding to each path is to be active (corresponding to active paths 906*a-d*) or passive (e.g., corresponding to passive paths 908*a-h*). If passive, the configuration information with which a TCP connection may be established for that path may be stored, but the TCP connection may not be established until an indication is received from the connection manager 940 indicating that the path should be made active. The connection manager 940 may be configured to communicate any suitable portion of the configuration information (e.g., configuration information corresponding to active paths only, configuration information for any active/passive path, etc.) to a NVMe/TCP initiator 925 (e.g., initiator 162, NVMe initiator 280, etc.) that may be configured to manage (e.g., store) that configuration information and/or establish or terminate corresponding TCP connections according to the configuration information. NVMe Agent 530 and/or VPP/DPDK 545 may operate as part of the NVMe/TCP initiator 925. The functionality provided by NVMe Agent 530 and/or VPP/DPDK 545 may be provided by the NVMe/

TCP initiator 925 and the process by which NVMe/TCP connections are established as discussed in connection with FIG. 5 may be similarly employed to establish the TCP connections between paths 830 and 840 and corresponding targets. NVMe/TCP initiator 925 may utilize NVMe Agent 530 and/or VPP/DPDK 545 to terminate NVMe/TCP connections as instructed by connection manager 940.

The functionality and operations discussed with respect to ongoing network traffic monitoring and the modifications made to the TCP connections and active/passive paths may be provided by the connection manager 940, and in a similar manner as described in FIG. 8 with respect to connection manager 860 and is not repeated here, for brevity.

Figure 10:
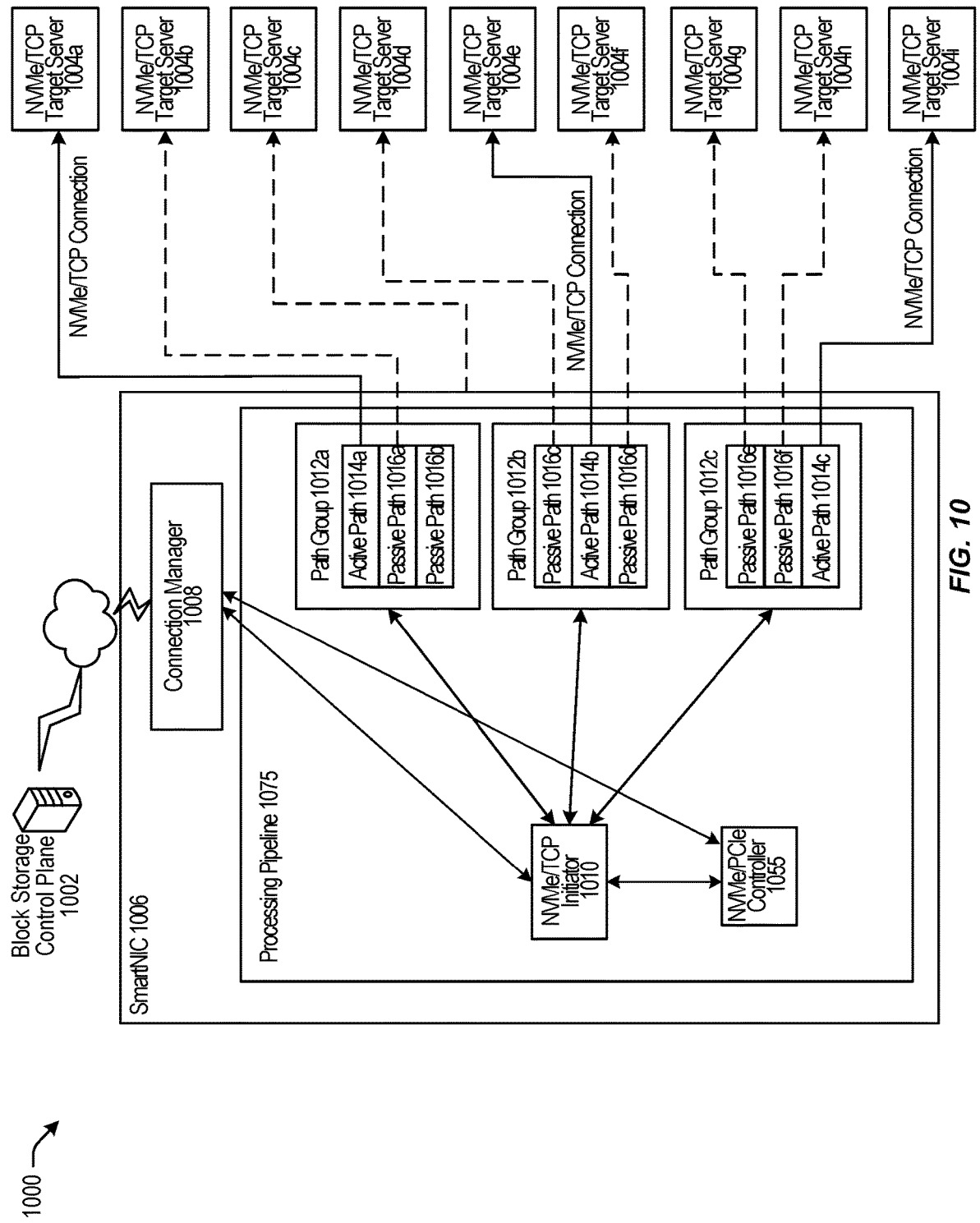
FIG. 10 is a diagram illustrating a process for configuring or modifying a number of NVMe over TCP connections utilized between a smartNIC and a storage data plane of a cloud computing environment, according to an embodiment.

FIG. 10 is a diagram illustrating a process 1000 for configuring or modifying a number of NVMe over TCP connections utilized between a smartNIC and a storage data plane of a cloud computing environment (e.g., the TCP connections discussed in connection with FIG. 8, the NVMe/TCP connections discussed in connection with FIGS. 6 and 9), according to an embodiment. As part of process 1000 configuration information may be generated by block storage control plane 1002 (e.g., block storage control plane 125, control plane 305, etc.). The configuration information may specify, for each path, an IP address associated with the smartNIC 802 and an IP address corresponding to a target server (e.g., one of NVMe/TCP target servers 904). In some embodiments, the configuration information may specify whether the TCP connection corresponding to each path is to be active (corresponding to active paths 906a-d) or passive (e.g., corresponding to passive paths 908a-h).

The number of paths corresponding to a particular BSDP volume/persistent storage may be identified by block storage control plane (BSCP) 1002 based at least in part on a performance threshold associated with a given BSDP volume/persistent storage. The BSDP volume/persistent storage may be associated with a namespace and the BSCP 1002 may include in the configuration information, a namespace or each active/passive path and, if utilized, for each path group (e.g., path groups 902). By way of example, a particular BSDP volume may be associated with a performance threshold that indicates the BSDP volume can process up to X amount input/output operations per second (IOPS). The BSCP 1002 may identify, in light of a predefined capability associated with active/passive paths (e.g., throughput Y, indicating a maximum number of IOPS each path can sustain), a number of paths needed, having a one-to-one correspondence with the number of active paths, and, if utilized, the number of path groups needed. In some embodiments, the BSCP 1002 may calculate how many paths (active paths/path groups), or active/established TCP connections are needed to meet the performance threshold associated with the volume (e.g., how many paths/established TCP connections capable of throughput Y are needed to meet performance threshold X). Once the number of paths/path groups/TCP connections needed are identified, the BSCP 1002 may assign each path an IP address associated with the smartNIC, an IP address corresponding to a target server (e.g., NVMe/TCP target servers 1004. The BSCP 1002 may designate (e.g., via including an associated indicator indicating active or passive) each path as being active or passive. In some embodiments, the BSCP 1002 may utilize path groups and the BSCP 1002 may generate the configuration information to indicate a single active path for each path group and, in some embodiments, one or more passive paths for each path group. As a non-limiting example, the BSCP 1002 may generate data for a given path that includes a namespace associated with the path, an indicator indicating that the path is designated as an active path or a passive path, an IP address associated with the smartNIC 1006 (e.g., smartNIC 910, smartNIC 802, etc.), an IP address associated with a NVMe/TCP target server (e.g., one of NVMe/TCP target server) that is selected based at least in part on identifying that server as being associated with the same namespace and depending on the capacity and load of the various target servers of a fleet that are configured to manage input/output of a given BSDP volume/namespace. As a non-limiting example, BSCP 1002 may generate configuration information corresponding to path groups 1012a-c, that individually include active paths 1014a-c, and passive paths 1016a-f, as depicted in FIG. 10.

The BSCP 1002 may provide the configuration information to connection manager 1008 (e.g., connection manager 940, connection manager 860, BSA 160, BSA 515, etc.) The connection manager 1008 may be configured to communicate any suitable portion of the configuration information (e.g., configuration information corresponding to active paths only, configuration information for any active/passive path, etc.) to a NVMe/TCP initiator 1010 (e.g., NVMe/TCP initiator 925, initiator 162, NVMe initiator 280, etc.) that may be configured to manage (e.g., store) that configuration information and/or establish or terminate corresponding TCP connections according to the configuration information. In some embodiments, the connection manager 1008 may forward only information corresponding to active paths identified in the configuration information to the NVMe/TCP initiator 1010 while storing the configuration information corresponding to passive paths in memory for subsequent use.

The connection manager 1008 may forward any suitable portion of the connection information or corresponding instructions to cause NVMe/TCP initiator 1010 to activate and/or establish active paths 1014a-d. As a non-limiting example, the NVMe/TCP initiator 1010 may include any suitable combination of the NVMe agent 530 and VPP/DPDK module 545. As similarly described in FIG. 5, NVMe agent 530 can establish a new I/O connection in response to a request from connection manager 1008 using the vector packet processing/dataplane development kit (VPP/DPDK) module 545. The VPP/DPDK module 545 can use a framework, such as VPP with the DPDK plugin, to process and route network packets. Upon receiving a request from NVMe agent 530, VPP/DPDK 545 can send a request to the P4 pipeline 550 (e.g., P4 pipeline 330) via the Ethernet (ETH) P4 module 555 running on the P4 match protection unit (MPU) 560. P4 pipeline 550 can establish an I/O connection with SPDK NVMe/TCP targets 565 (e.g., target 230, target fleet 145, NVMe/TCP target 320a-320c, etc.). Establishing a connection can include sending instructions to NVMe driver 535 or SPDK NVMe/TCP targets 565. NVMe/TCP connections may not be established for any the passive paths 1016 until and unless the connection manager 1008 instructs the NVMe/TCP initiator 1010 to establish, using passive path data, a new NVMe/TCP connection. Once established, the NVMe/TCP initiator 1010 and/or the connection manager 1008 may update the configuration information stored at the smartNIC 1006 to indicate the newly established NVMe/TCP connection is associated with the currently active path. This may include updating an indicator of the configuration information corresponding to that path to a value that indicates an active path.

The NVMe/TCP initiator 1010 may be instructed by connection manager 1008 at any suitable time to change an active path to a passive path, or vice versa. If changing an active path to a passive path, the connection manager 1008 may instruct the NVMe/TCP initiator 1010 to terminate a previously established NVMe/TCP connection corresponding to a particular active path (e.g., active path 1014*a*). Once terminated, the NVMe/TCP initiator 1010 and/or the connection manager 1008 may update the configuration information stored at the smartNIC 1006 to indicate the terminated NVMe/TCP connection is associated with a passive path. This may include updating an indicator of the configuration information corresponding to that path to a value that indicates a passive path.

The NVMe/PCIe Controller 1020 (NVMe/PCIe Controller 938, NVMe/PCIe Controller 824, NVMe/PCIe Controller 844, etc.) may receive network traffic from any suitable VM/BM (e.g., VMs 905, 805, 807, etc.) and may forward the network traffic of processing pipeline 1022 (processing pipeline 924, processing pipeline 823, etc.) in the manner described above. Namespace devices are not depicted within processing pipeline 1022 for simplicity. However, it is contemplated that processing pipeline 1022 includes any suitable number of namespace devices that are utilized in the manner described above in connection with at least FIGS. 8 and 9.

Figure 11:
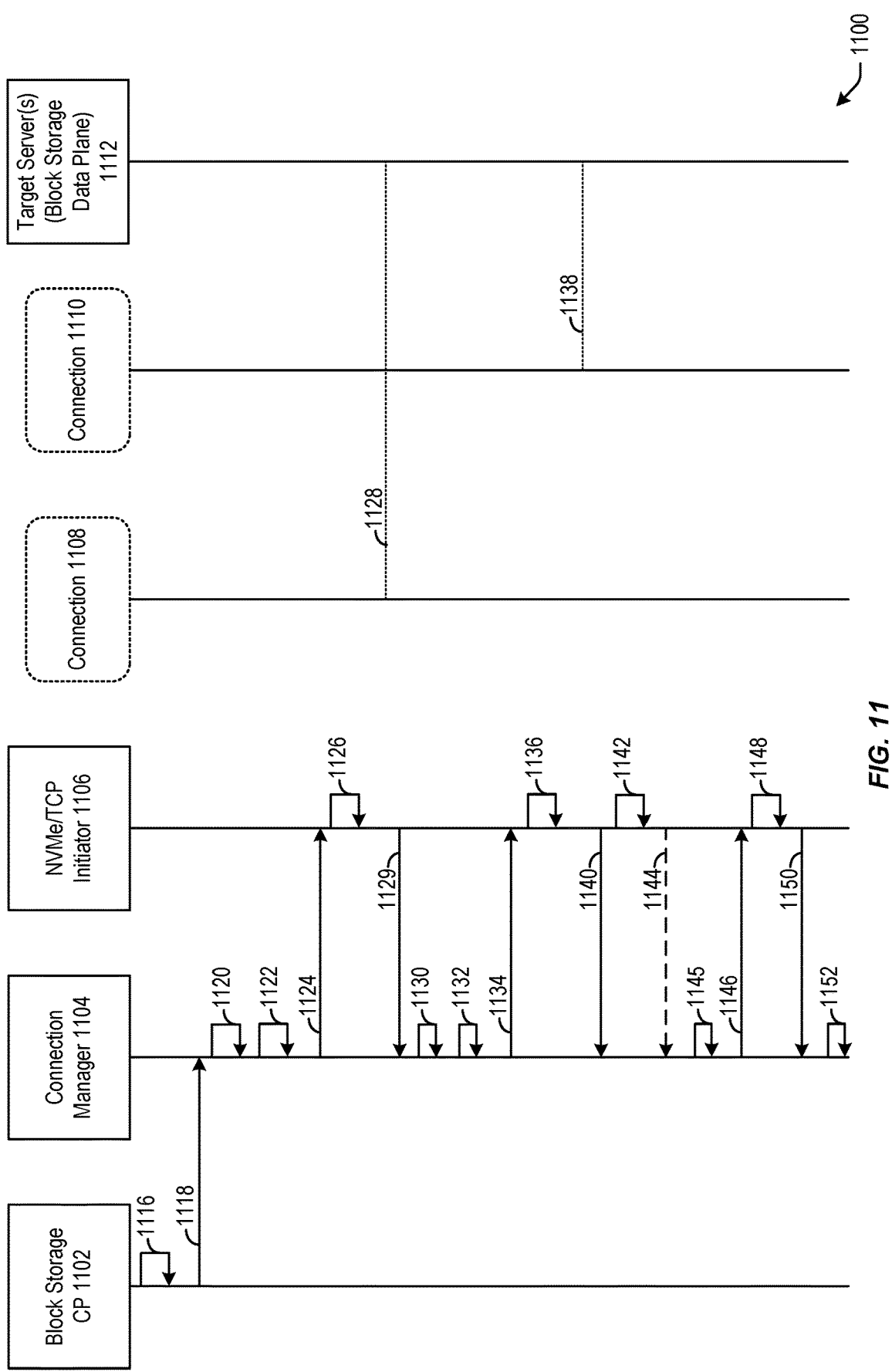
FIG. 11 is a diagram illustrating a process for activating or deactivating a path utilized between a smartNIC and a storage data plane of a cloud computing environment, according to an embodiment.

FIG. 11 is a diagram illustrating a process 1100 for activating (e.g., establishing) or deactivating (e.g., terminating) a NVMe/TCP connection corresponding to a path between a smartNIC and a storage data plane of a cloud computing environment, according to an embodiment.

The process 1100 may begin at 1116, where configuration information may be generated by block storage control plane (BSCP) 1102 (e.g., block storage control plane 1002, block storage control plane 125, control plane 305, etc.). The configuration information may specify for each path: an IP address associated with the smartNIC and an IP address corresponding to one of target server(s) 1112 (e.g., NVMe/TCP target servers 904, targets 814, etc., components of the block storage data plane of FIG. 1 and/or of the data plane of FIG. 3). In some embodiments, the configuration information may specify that the portion of the configuration information corresponding to connection 1108 is associated with an active path and the configuration information corresponding to connection 1110 is associated with a passive path. In some embodiments, the paths corresponding to connection 1108 and connection 1110 are associated with the same namespace (e.g., a namespace with which target server(s) 1112 are also associated) and/or path group (e.g., path group 902*a*). Initially, neither connection 1108 nor connection 1110 are established. The content and number of paths and/or which paths are identified as active/passive may be determined by the BSCP 1102 in the manner discussed above in connection with FIG. 10. The BSCP 1102 may transmit the configuration information (e.g., including configuration information corresponding to connections 1108 and 1110) at 1118 to connection manager 1104 (e.g., connection manager 940, connection manager 860, etc.). As a non-limiting example, the configuration information may specify that a path corresponding to connection 1108 is an active path and a path corresponding to connection 1110 is a passive path. In some embodiments, a performance capability (e.g., a throughput value) for each path may be identified in the configuration information and/or a performance threshold of the B SDP volume to which the active and passive path are associated may be provided in the configuration information.

At 1120, the connection manager 1104 may receive and store the configuration information at the smartNIC.

At 1122, the connection manager 1104 may set a performance threshold to a performance threshold value provided in the configuration information. In some embodiments, the connection manager 1104 may calculate the performance threshold value based at least in part on a throughput associated with each active path associated with a particular BSDP volume or namespace. As a non-limiting example, the configuration information may indicate a throughput value corresponding to a throughput capability for each active path that indicates a number of IOPS each path can sustain. The throughput value may indicate, for example that each active path may sustain 60,000 IOPS. The connection manager 1104 may calculate a performance threshold value based at least in part on multiplying the throughput value (60,000) by the number of active paths identified in the configuration information. As another example, a performance threshold value may be provided in the configuration information and the connection manager 1104 may store the performance threshold value provided.

At 1124, the connection manager 1104 may forward any suitable portion of the connection information or corresponding instructions to cause NVMe/TCP initiator 1106 (e.g., NVMe/TCP initiator 925, etc.) to activate and/or establish TCP connections corresponding to active paths. In the ongoing example, connection manager 1104 may forward only the configuration information for the designated active path corresponding to connection 1108.

At 1126, the NVMe/TCP initiator 1106 may utilize any suitable combination of the NVMe agent 530 and VPP/DPDK module 545. In a similar manner as described in FIG. 5, NVMe agent 530 can establish a new I/O connection corresponding in response to a request from connection manager 1104 using the vector packet processing/dataplane development kit (VPP/DPDK) module 545. The VPP/DPDK module 545 can use a framework, such as VPP with the DPDK plugin, to process and route network packets. Upon receiving a request from NVMe agent 530, VPP/DPDK 545 can send a request to the P4 pipeline 550 (e.g., P4 pipeline 330) via the Ethernet (ETH) P4 module 555 running on the P4 match protection unit (MPU) 560. P4 pipeline 550 can establish the connection 1108 between the smartNIC and one of target server(s) 1112 as indicated at 1128. Connection 1110 may not be established at this time. In some embodiments, the performance threshold value discussed in connection with 1122 may not be calculated until connection 1108 is established. Thus, in some embodiments, the NVMe/TCP initiator 1106 may provide feedback at 1129 to connection manager 1104 indicating that connection 1108 has been established. The calculations described above to calculate the performance threshold value based on the number of active connections may be performed in response to this feedback.

At 1130, connection manager 1104 may monitor the connection 1108 and/or the network traffic utilizing the connection 1108 (and any other established connection associated with the same namespace and/or BSDP volume) to determine the number of IOPS provided via connection 1108 (and any other established connections associated with the same namespace and/or BSDP volume). The size of the IO operations may be utilized to calculate a throughput value for the B SDP volume and/or namespace. Monitoring the network traffic may be ongoing and according to a predefined frequency and/or schedule.

At 1132, at any suitable time, the connection manager 1104 and/or NVMe/TCP initiator 1106 may identify the connection 1108 has been lost or is otherwise unusable. In response, the connection manager 1104 may transmit instructions to NVMe/TCP initiator 1106 indicating that connection 1110 is to be made active. The data transmitted to NVMe/TCP initiator 1106 may include additional data that indications connection 1108 is to be made passive.

At 1136, NVMe/TCP initiator 1106 may perform similar operations as discussed in connection with 1126 to establish connection 1110 with one of target server(s) 1112. In some embodiments, the connection 1110 may be to a different target server than the one associated with connection 1108. The NVMe/TCP initiator 1106 may provide feedback to the connection manager 1104 at 1140 to update the indicator associated with the configuration information corresponding to connection 1110 to indicate the connection 1110 is an active path. If connection 1108 has been lost, the NVMe/TCP initiator 1106 may provide feedback at 1144 to indicate the connection 1108 is now associated with a passive path. Alternatively, at 1142, the NVMe/TCP initiator 1106 may perform similar operations using NVMe agent 530 and VPP/DPDK 545 to terminate the connection 1108. One terminated, the NVMe/TCP initiator 1106 may provide feedback at 1144 to indicate the connection 1108 is now associated with a passive path. The feedback of 1140 may be used by the connection manager 1104 to recalculate the performance threshold associated with all established TCP connections corresponding to the BSDP volume and/or namespace.

At 1145, the connection manager 1104 may continue monitoring the network traffic associated with connection 1110 (the now active path) to the corresponding target server of target server(s) 1112 as well as any other established NVMe/TCP connection associated with the same B SDP volume and/or namespace. Due to the monitoring performed at 1145, the connection manager 1104 may identify that the current throughput of the network traffic has breached the performance threshold for a threshold period of time and may proceed to 1146, where the connection manager 1104 may instruct/trigger NVMe/TCP initiator 1106 to perform the process described in the above figures for activating additional paths (including establishing one or more TCP connections) associated with BSDP volume and/or namespace. As another example, connection manager 1104 may identify that the current throughput of the network traffic has fallen below the performance threshold for a threshold period of time (e.g., perhaps fallen below by at least a threshold amount) and may proceed to 1146, where the connection manager 1104 may instruct/trigger NVMe/TCP initiator 1106 to perform the process described in the above figures for deactivating additional paths (including terminating established TCP connections) associated with BSDP volume and/or namespace.

At 1148, the connection manager 1104 may instruct the NVMe/TCP initiator 1106 to activate one or more paths (establishing one or more corresponding TCP connections) or deactivate one or more paths (terminating one or more previously established corresponding TCP connections) corresponding to the same BSDP volume and/or namespace in a similar manner as described above. Performing these operations increase or decrease, respectively, the number of established connections between smartNIC and target server(s) 1112. As the number of established connections is increased or decreased, based on activating or deactivating a path (establishing/terminating a TCP connection corresponding to that path), feedback may be provided at 1150.

At 1152, the connection manager 1104 may recalculate the performance threshold based at least in part on the feedback provided and utilized the newly calculated performance threshold for future determinations as to whether the number of established connections are to be increased through activating previously deactivated active paths (e.g., by establishing a corresponding TCP connection for the active path), or through deactivating active paths (e.g., by terminating a corresponding TCP connection that was previously established for the active path).

The operations of process 1100 may be performed any suitable number of times, in any suitable order on an ongoing basis enabling the connection manager 1104 to dynamically adjust the number of established TCP connections used for active paths of a given BSDP volume or namespace. These techniques provide improvements over conventional methods by enabling the TCP connections utilized for a given BSDP volume or namespace to be dynamically modified (e.g., increased or decreased) to more closely match the network traffic experienced at run time while providing sufficient connections to meet the network traffic demand. When the network traffic increases, the number of established TCP connections corresponding to active paths may be increased. When the network traffic decreases, the number of established TCP connections corresponding to the active paths for that BSDP volume or namespace may be decreased. This reduces the memory and CPU usage at the smartNIC on which connection manager 1104 executes that was previously wasted through managing unnecessary or underutilized TCP connections when the number of established TCP connections exceeded the number needed to handle the current network traffic throughput.

Figure 12:
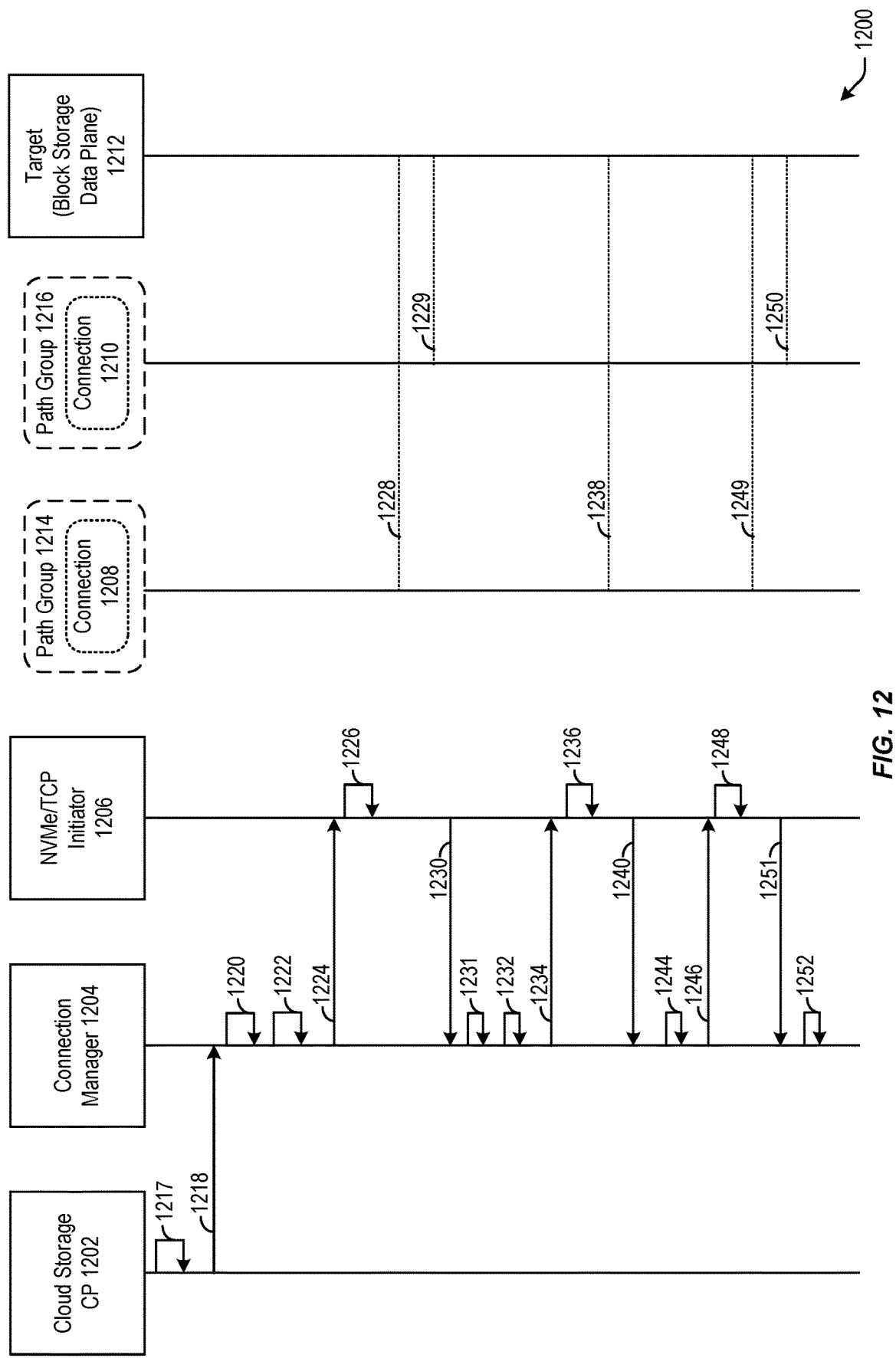
FIG. 12 is a diagram illustrating a process for activating or deactivating a path group corresponding to a number of paths associated with a smartNIC and a storage data plane of a cloud computing environment, according to an embodiment.

FIG. 12 is a diagram illustrating a process 1200 for activating or deactivating a path group corresponding to a number of paths associated with a smartNIC and a storage data plane of a cloud computing environment, according to an embodiment. Path groups 1214 and 1216 may correspond to the same BSDP volume/persistent storage and/or namespace. An example of a path group 1214 may include path group 902a of FIG. 9 which include, for illustrative purposes only, active path 906a and passive paths 908a and 908b. An example of a path group 1216 may include path group 902b of FIG. 9 which include, for illustrative purposes only, active path 906b and passive paths 908c and 908d.

The process 1200 may begin at 1217, where configuration information may be generated by block storage control plane (BSCP) 1202 (e.g., block storage control plane 1102, block storage control plane 1002, block storage control plane 125, control plane 305, etc.). The configuration information may specify for each path of path groups 1214 and 1216, an IP address associated with the smartNIC and an IP address corresponding to one of target server(s) 1212 (e.g., NVMe/TCP target servers 904, targets 814, etc., components of the block storage data plane of FIG. 1 and/or of the data plane of FIG. 3). In some embodiments, the configuration information may specify that the configuration information corresponding to connection 1208 is associated with an active path of path group 1214, and that the configuration information corresponding to connection 1210 is associated with an active path of path group 1216. In some embodiments, the paths corresponding to connection 1208 and connection 1210 are associated with the same namespace (e.g., a namespace with which target server(s) 1112 are also associated). Initially, neither connection 1208 nor connection 1210 are established. The content and number of paths and/or which paths are identified as active/passive may be determined by the BSCP 1202 in the manner discussed above in connection with FIGS. 10 and 11. The BSCP 1202 may transmit the configuration information (e.g., including configuration information corresponding to each of the paths of path groups 1214 and 1216 or configuration information corresponding to the active path of path group 1214 and the active path corresponding to path group 1216, corresponding to connections 1208 and 1210, respectively) at 1218 to connection manager 1204 (e.g., connection manager 1040, connection manager 940, connection manager 860, etc.). In some embodiments, a performance capability (e.g., a throughput value) for each active path of the path groups corresponding to a common BSDP volume and/or namespace (e.g., the active paths for path groups 1214 and 1216) may be identified in the configuration information and/or a performance threshold of the BSDP volume to which the active and passive path are associated may be provided in the configuration information.

At 1220, the connection manager 1204 may receive and store the configuration information at the smartNIC.

At 1222, the connection manager 1204 may set a performance threshold to a performance threshold value provided in the configuration information. In some embodiments, the connection manager 1204 may calculate the performance threshold value based at least in part on a throughput associated with each active path of a particular B SDP volume or namespace. As a non-limiting example, the configuration information may indicate a throughput value corresponding to a throughput capability for each path that indicates a number of IOPS each path can sustain. The throughput value may indicate, for example, that each path may sustain 60,000 IOPS. The connection manager 1204 may calculate a performance threshold based at least in part on multiplying the throughput value (60,000 IOPS) by the number of active paths identified in the configuration information. As another example, a performance threshold value may be provided in the configuration information and the connection manager 1204 may store the performance threshold value provided. In the example depicted in FIG. 12, the connection manager 1204 may calculate the performance threshold to be subsequently used for a given BSDP volume and/or namespace based at least in part on identifying that 1208 and 1210 are active paths associated with that B SDP volume and/or namespace.

At 1224, the connection manager 1204 may forward any suitable portion of the connection information or corresponding instructions to cause NVMe/TCP initiator 1206 (e.g., NVMe/TCP initiator 1106, NVMe/TCP initiator 925, etc.) to activate paths and/or to establish TCP connections corresponding to active paths. In the ongoing example, connection manager 1104 may forward only the configuration information for active paths corresponding to connection 1208 and connection 1210 and may forgo forwarding information corresponding to any passive paths of path groups 1214 and 1216.

At 1226, the NVMe/TCP initiator 1206 may utilize any suitable combination of the NVMe agent 530 and VPP/DPDK module 545. In a similar manner as described in FIG. 5 and at 1126 of FIG. 11 to establish connections 1208 and 1210 as depicted at 1228 and 1229, respectively. Feedback may be provided at 1230, indicating that the connections 1208 and 1210 have been established. The connection manager 1204 may recalculate the performance threshold value based on the feedback.

At 1231, connection manager 1204 may monitor the connections 1208 and 1210 and/or the network traffic utilizing the connections 1208 and/or 1210 (and any other established connection associated with the same namespace and/or BSDP volume) to determine the number of IOPS provided via the connections associated with that BSDP volume and/or namespace. The size of the IO operations may be utilized to calculate a throughput value that indicates a current throughput for the network traffic utilizing the connections associated with the BSDP volume and/or namespace. Monitoring the network traffic may be ongoing and according to a predefined frequency and/or schedule.

At 1232, the connection manager 1104 may monitor the network traffic associated with connections 1208 and 1210 (corresponding to active paths of path groups 1214 and 1216) to corresponding target servers of target server(s) 1112 as well as any other NVMe/TCP connection associated with the same BSDP volume and/or namespace. Due to the monitoring performed at 1232, the connection manager 1204 may whether the current throughput of the network traffic has breached or fallen below the performance threshold for a threshold period of time and may trigger/instruct the NVMe/TCP initiator 1106 accordingly to activate or deactivate one or more paths/path groups. Activating an active path (or a path group) may include establishing a TCP connection associated with that active path (or any active path associated with a given path group). Deactivating an active path (or a path group) may include terminating connections corresponding to that active path (or any active path of a path group) associated with BSDP volume and/or namespace.

By way of example, at 1232, the connection manager 1204 may identify that the current throughput has fallen below the performance threshold for a threshold period of time and may instruct the NVMe/TCP initiator 1206, at 1234, to deactivate the active path corresponding to connection 1210. In some embodiments, such as when the connection 1210 corresponds to an active path of a path group (e.g., path group 1216), the connection manager 1204 may instruct the NVMe/TCP initiator 1206 to deactivate any established connection corresponding to the path group 1216 (in this example, connection 1210). Deactivating any active path or path group (e.g., path group 1216) may include terminating, at 1236, a previously established TCP connection corresponding to an active path (e.g., connection 1210 which was established at 1229). As the number of established connections and/or active paths is increased or decreased, based on activating or deactivating a connection corresponding to a path, feedback may be provided at 1240. The feedback provided at 1240 of the ongoing example may include an indication that path group 1216, or the active path corresponding to connection 1210 is deactivated/inactive, leaving, in this example, connection 1208 as the only established connection between the smartNIC and the target server(s) 1212 as depicted at 1238. The connection manager 1204 may use the feedback provided at 1240 to update the performance threshold for the BSDP volume and/or namespace based at least in part on the total number of established TCP connections corresponding to active paths associated with that BSDP volume and/or namespace.

At 1244, the connection manager 1204 may continue monitoring the network traffic associated with any established connection associated with the BSDP volume and/or namespace (now, connection 1208, as well as any other NVMe/TCP connection associated with the same BSDP volume and/or namespace). Due to the monitoring performed at 1244, the connection manager 1104 may identify that the current throughput of the network traffic has breached the current performance threshold for a threshold period of time and may proceed to 1246.

At 1246, the connection manager 1204 may instruct the NVMe/TCP initiator 1206 to activate the active path corresponding to connection 1210. In some embodiments, the instructions provided at 1246 may indicate to the NVMe/TCP initiator 1206 that all active path(s) associated with the path group 1216 are to be activated. The NVMe/TCP initiator 1206 may perform similar operations as those described above to establish (or reestablish, in this example) the TCP connection corresponding to connection 1210 as depicted at 1249 and 1250. As the number of established connections and/or active paths is increased or decreased, based on activating or deactivating a connection corresponding to a path, feedback may be provided at 1251. The feedback provided at 1251 of the ongoing example, may indicate that both connections 1208 and 1210 are established.

At 1252, the connection manager 1204 may recalculate the performance threshold based at least in part on the feedback provided at 1251 and utilize the newly calculated performance threshold for future determinations as to whether the number of established connections corresponding to a given BSDP volume and/or namespace are to be increased through activating previously deactivated active paths (e.g., by establishing a corresponding TCP connection for the active path), or through deactivating previously activated active paths (e.g., by terminating a corresponding TCP connection that was previously established for the active path).

The operations of process 1200 may be performed any suitable number of times, in any suitable order on an ongoing basis enabling the connection manager 1204 to dynamically adjust the number of established TCP connections used for active paths of a given BSDP volume or namespace. When the network traffic increases, the number of established TCP connections corresponding to active paths may be increased. When the network traffic decreases, the number of established TCP connections corresponding to the active paths for that B SDP volume or namespace may be decreased. As described, the activation and deactivation of an active path may be done from a path group level, applying the activation or deactivation to every active path of the path group. These techniques reduce the memory and CPU usage at the smartNIC on which connection manager 1204 executes that was previously wasted through managing unnecessary or underutilized TCP connections when the number of established TCP connections exceeded the number needed to handle the current network traffic throughput.

Figure 13:
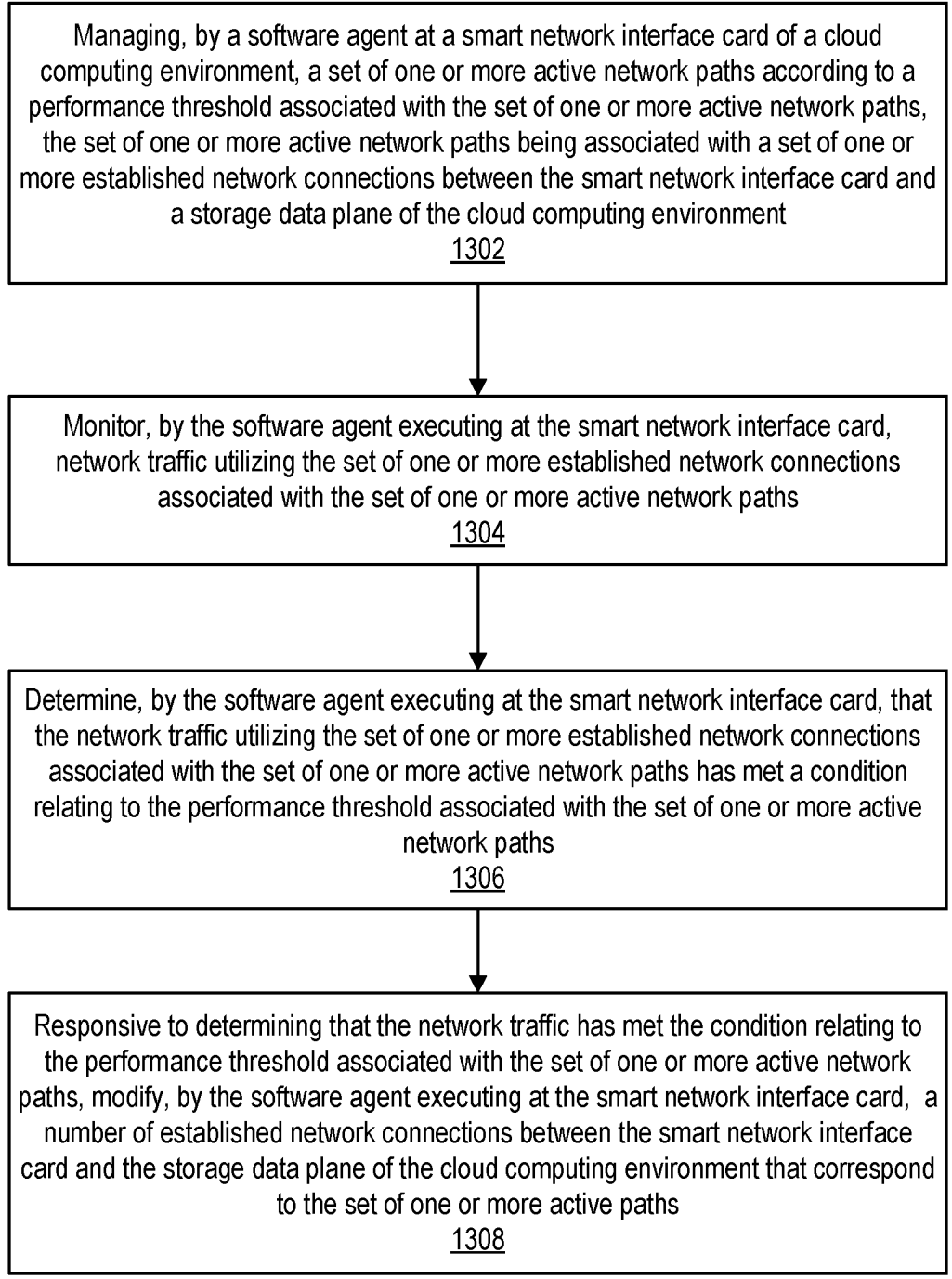
FIG. 13 is a diagram illustrating a method for managing network paths between a smartNIC and a storage data plane of a cloud computing environment, according to an embodiment.

FIG. 13 is a diagram illustrating a method 1300 for managing network paths between a smartNIC and a storage data plane of a cloud computing environment, according to an embodiment.

The method 1300 may begin at 1302, where a set of one or more active network paths (e.g., active paths 906, active paths for which a NVMe/TCP connection has been established) may be monitored, by a software agent at a smart network interface card of a cloud computing environment (e.g., connection manager 940), according to a performance threshold associated with the set of one or more active network paths. In some embodiments, the set of one or more active network paths may be associated with a set of one or more established network connections between the smart network interface card and a storage data plane of the cloud computing environment. By way of example, the set of active paths 906 may be associated with the NVMe/TCP connections of FIG. 9.

At 1304, the software agent executing at the smart network interface card may monitor network traffic utilizing the set of one or more established network connections associated with the set of one or more active network paths (e.g., the connections 1208 and 1210 as described at 1231 and 1232 of FIG. 12).

At 1306, the software agent executing at the smart network interface card may determine that the network traffic utilizing the set of one or more established network connections associated with the set of one or more active network paths has met a condition relating to the performance threshold associated with the set of one or more active network paths (or a performance threshold associated with the set of one or more established network connections associated with the set of one or more active network paths). Meeting a condition related to the performance threshold associated with the set of one or more active network paths may include: 1) identifying that the current throughput of all of the established network connections corresponding to the set of one or more active network paths breaches the performance threshold, or 2) identifying the current throughput of all of the established network connections corresponding to the set of one or more active network paths falls below (e.g., at least by a threshold amount) the performance threshold. In some embodiments, meeting the condition may include identifying that the condition (e.g., breaching or falling under the threshold) has occurred for at least a threshold period of time.

At 1308, responsive to determining at 1306 that the network traffic has met the condition relating to the performance threshold associated with the set of one or more active network paths, the software agent executing at the smart network interface card may modify a number of established network connections between the smart network interface card and the storage data plane of the cloud computing environment. The established network connections may correspond to the set of one or more active paths.

This method 1300 may be performed on an ongoing basis enabling the software agent to dynamically adjust the number of established TCP connections used for a given BSDP volume or namespace. These techniques provide improvements over conventional methods by enabling the TCP connections utilized for a given BSDP volume or namespace to be dynamically modified (e.g., increased or decreased) to more closely match the network traffic experienced at run time. When the network traffic increases, the number of TCP connections/active paths may be increased. When the network traffic decreased the number of TCP connections/active paths may be decreased. This reduces the memory and CPU usage at the smartNIC that was previously wasted through managing unnecessary or underutilized TCP connections when the number of TCP connections exceeded the number needed to handle the current network traffic throughput.

Infrastructure as a Service Architecture

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 14:
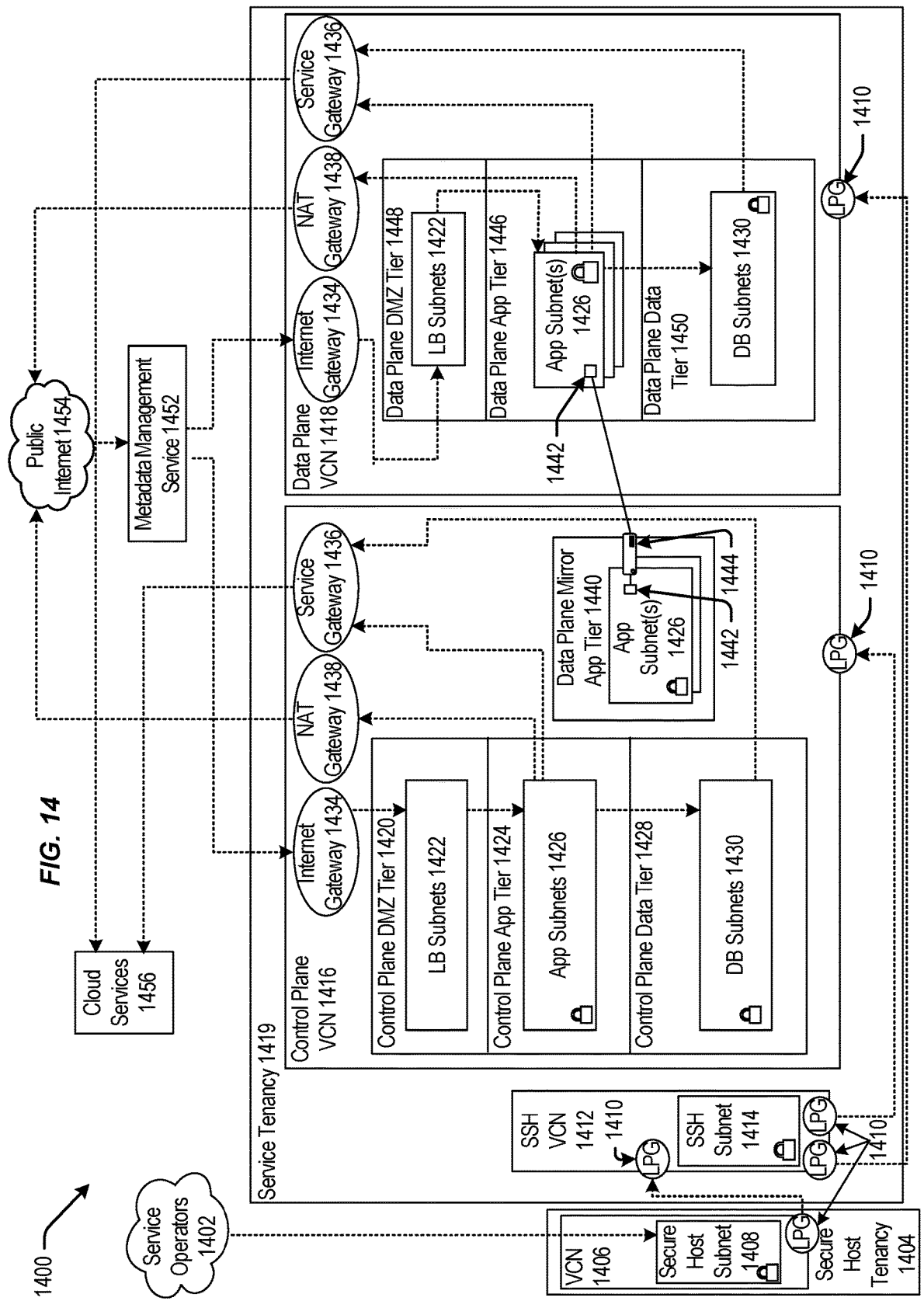
FIG. 14 is a block diagram illustrating one pattern for implementing a cloud infrastructure as a service system, according to at least one embodiment.

FIG. 14 is a block diagram 1400 illustrating an example pattern of an IaaS architecture, according to at least one embodiment. Service operators 1402 can be communicatively coupled to a secure host tenancy 1404 that can include a virtual cloud network (VCN) 1406 and a secure host subnet 1408. In some examples, the service operators 1402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1406 and/or the Internet.

The VCN 1406 can include a local peering gateway (LPG) 1410 that can be communicatively coupled to a secure shell (SSH) VCN 1412 via an LPG 1410 contained in the SSH VCN 1412. The SSH VCN 1412 can include an SSH subnet 1414, and the SSH VCN 1412 can be communicatively coupled to a control plane VCN 1416 via the LPG 1410 contained in the control plane VCN 1416. Also, the SSH VCN 1412 can be communicatively coupled to a data plane VCN 1418 via an LPG 1410. The control plane VCN 1416 and the data plane VCN 1418 can be contained in a service tenancy 1419 that can be owned and/or operated by the IaaS provider.

The control plane VCN 1416 can include a control plane demilitarized zone (DMZ) tier 1420 that acts as a perimeter network (e.g., portions of a corporate network between the corporate intranet and external networks). The DMZ-based servers may have restricted responsibilities and help keep breaches contained. Additionally, the DMZ tier 1420 can include one or more load balancer (LB) subnet(s) 1422, a control plane app tier 1424 that can include app subnet(s) 1426, a control plane data tier 1428 that can include database (DB) subnet(s) 1430 (e.g., frontend DB subnet(s) and/or backend DB subnet(s)). The LB subnet(s) 1422 contained in the control plane DMZ tier 1420 can be communicatively coupled to the app subnet(s) 1426 contained in the control plane app tier 1424 and an Internet gateway 1434 that can be contained in the control plane VCN 1416, and the app subnet(s) 1426 can be communicatively coupled to the DB subnet(s) 1430 contained in the control plane data tier 1428 and a service gateway 1436 and a network address translation (NAT) gateway 1438. The control plane VCN 1416 can include the service gateway 1436 and the NAT gateway 1438.

The control plane VCN 1416 can include a data plane mirror app tier 1440 that can include app subnet(s) 1426. The app subnet(s) 1426 contained in the data plane mirror app tier 1440 can include a virtual network interface controller (VNIC) 1442 that can execute a compute instance 1444. The compute instance 1444 can communicatively couple the app subnet(s) 1426 of the data plane mirror app tier 1440 to app subnet(s) 1426 that can be contained in a data plane app tier 1446.

The data plane VCN 1418 can include the data plane app tier 1446, a data plane DMZ tier 1448, and a data plane data tier 1450. The data plane DMZ tier 1448 can include LB subnet(s) 1422 that can be communicatively coupled to the app subnet(s) 1426 of the data plane app tier 1446 and the Internet gateway 1434 of the data plane VCN 1418. The app subnet(s) 1426 can be communicatively coupled to the service gateway 1436 of the data plane VCN 1418 and the NAT gateway 1438 of the data plane VCN 1418. The data plane data tier 1450 can also include the DB subnet(s) 1430 that can be communicatively coupled to the app subnet(s) 1426 of the data plane app tier 1446.

The Internet gateway 1434 of the control plane VCN 1416 and of the data plane VCN 1418 can be communicatively coupled to a metadata management service 1452 that can be communicatively coupled to public Internet 1454. Public Internet 1454 can be communicatively coupled to the NAT gateway 1438 of the control plane VCN 1416 and of the data plane VCN 1418. The service gateway 1436 of the control plane VCN 1416 and of the data plane VCN 1418 can be communicatively couple to cloud services 1456.

In some examples, the service gateway 1436 of the control plane VCN 1416 or of the data plane VCN 1418 can make application programming interface (API) calls to cloud services 1456 without going through public Internet 1454. The API calls to cloud services 1456 from the service gateway 1436 can be one-way: the service gateway 1436 can make API calls to cloud services 1456, and cloud services 1456 can send requested data to the service gateway 1436. But, cloud services 1456 may not initiate API calls to the service gateway 1436.

In some examples, the secure host tenancy 1404 can be directly connected to the service tenancy 1419, which may be otherwise isolated. The secure host subnet 1408 can communicate with the SSH subnet 1414 through an LPG 1410 that may enable two-way communication over an otherwise isolated system. Connecting the secure host subnet 1408 to the SSH subnet 1414 may give the secure host subnet 1408 access to other entities within the service tenancy 1419.

The control plane VCN 1416 may allow users of the service tenancy 1419 to set up or otherwise provision desired resources. Desired resources provisioned in the control plane VCN 1416 may be deployed or otherwise used in the data plane VCN 1418. In some examples, the control plane VCN 1416 can be isolated from the data plane VCN 1418, and the data plane mirror app tier 1440 of the control plane VCN 1416 can communicate with the data plane app tier 1446 of the data plane VCN 1418 via VNICs 1442 that can be contained in the data plane mirror app tier 1440 and the data plane app tier 1446.

In some examples, users of the system, or customers, can make requests, for example create, read, update, or delete (CRUD) operations, through public Internet 1454 that can communicate the requests to the metadata management service 1452. The metadata management service 1452 can communicate the request to the control plane VCN 1416 through the Internet gateway 1434. The request can be received by the LB subnet(s) 1422 contained in the control plane DMZ tier 1420. The LB subnet(s) 1422 may determine that the request is valid, and in response to this determination, the LB subnet(s) 1422 can transmit the request to app subnet(s) 1426 contained in the control plane app tier 1424. If the request is validated and requires a call to public Internet 1454, the call to public Internet 1454 may be transmitted to the NAT gateway 1438 that can make the call to public Internet 1454. Metadata that may be desired to be stored by the request can be stored in the DB subnet(s) 1430.

In some examples, the data plane mirror app tier 1440 can facilitate direct communication between the control plane VCN 1416 and the data plane VCN 1418. For example, changes, updates, or other suitable modifications to configuration may be desired to be applied to the resources contained in the data plane VCN 1418. Via a VNIC 1442, the control plane VCN 1416 can directly communicate with, and can thereby execute the changes, updates, or other suitable modifications to configuration to, resources contained in the data plane VCN 1418.

In some embodiments, the control plane VCN 1416 and the data plane VCN 1418 can be contained in the service tenancy 1419. In this case, the user, or the customer, of the system may not own or operate either the control plane VCN 1416 or the data plane VCN 1418. Instead, the IaaS provider may own or operate the control plane VCN 1416 and the data plane VCN 1418, both of which may be contained in the service tenancy 1419. This embodiment can enable isolation of networks that may prevent users or customers from interacting with other users', or other customers', resources. Also, this embodiment may allow users or customers of the system to store databases privately without needing to rely on public Internet 1454, which may not have a desired level of threat prevention, for storage.

In other embodiments, the LB subnet(s) 1422 contained in the control plane VCN 1416 can be configured to receive a signal from the service gateway 1436. In this embodiment, the control plane VCN 1416 and the data plane VCN 1418 may be configured to be called by a customer of the IaaS provider without calling public Internet 1454. Customers of the IaaS provider may desire this embodiment since database(s) that the customers use may be controlled by the IaaS provider and may be stored on the service tenancy 1419, which may be isolated from public Internet 1454.

Figure 15:
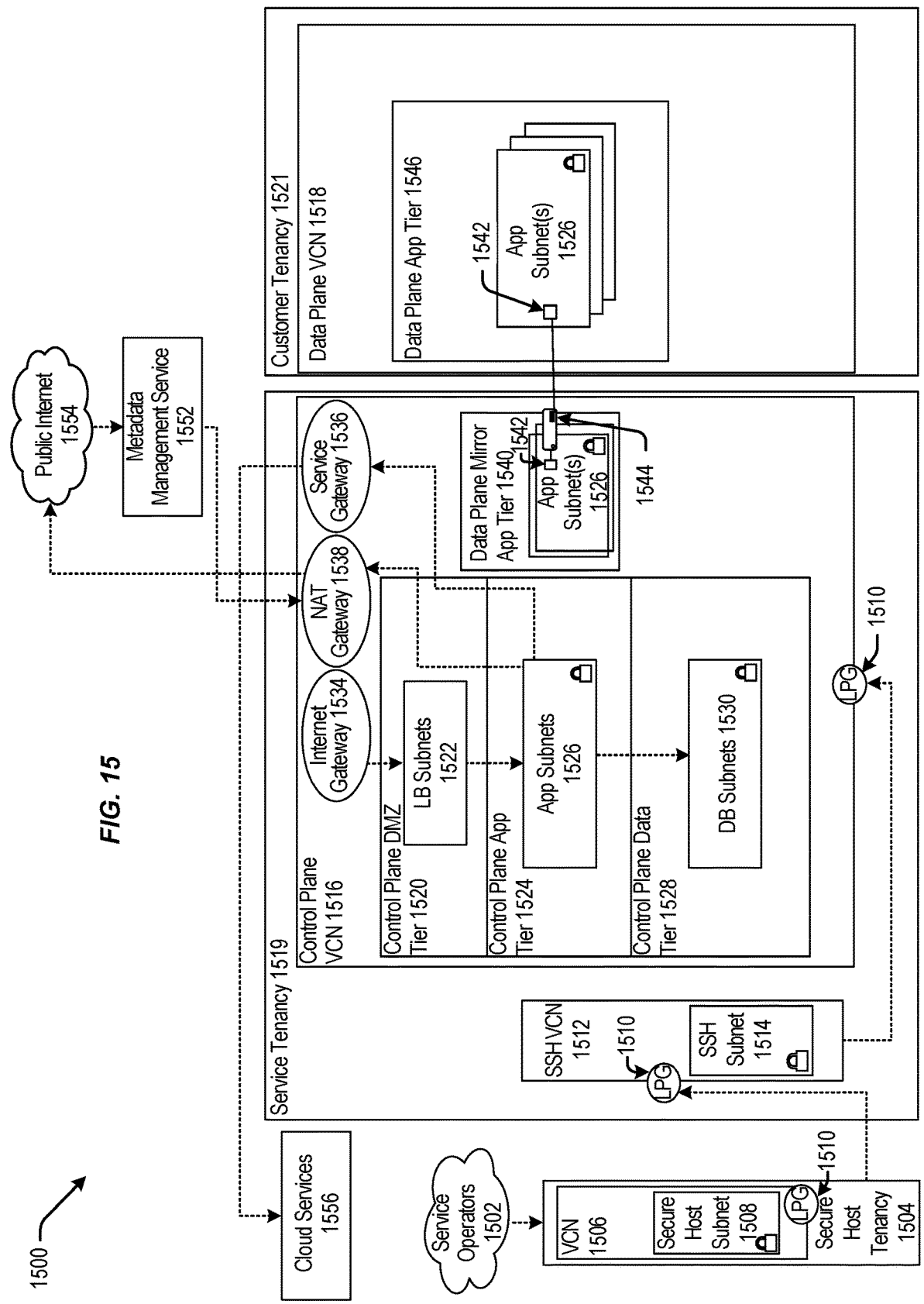
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1402 of FIG. 14) can be communicatively coupled to a secure host tenancy 1504 (e.g., the secure host tenancy 1404 of FIG. 14) that can include a virtual cloud network (VCN) 1506 (e.g., the VCN 1406 of FIG. 14) and a secure host subnet 1508 (e.g., the secure host subnet 1408 of FIG. 14). The VCN 1506 can include a local peering gateway (LPG) 1510 (e.g., the LPG 1410 of FIG. 14) that can be communicatively coupled to a secure shell (SSH) VCN 1512 (e.g., the SSH VCN 1412 of FIG. 14) via an LPG 1410 contained in the SSH VCN 1512. The SSH VCN 1512 can include an SSH subnet 1514 (e.g., the SSH subnet 1414 of FIG. 14), and the SSH VCN 1512 can be communicatively coupled to a control plane VCN 1516 (e.g., the control plane VCN 1416 of FIG. 14) via an LPG 1510 contained in the control plane VCN 1516. The control plane VCN 1516 can be contained in a service tenancy 1519 (e.g., the service tenancy 1419 of FIG. 14), and the data plane VCN 1518 (e.g., the data plane VCN 1418 of FIG. 14) can be contained in a customer tenancy 1521 that may be owned or operated by users, or customers, of the system.

The control plane VCN 1516 can include a control plane DMZ tier 1520 (e.g., the control plane DMZ tier 1420 of FIG. 14) that can include LB subnet(s) 1522 (e.g., LB subnet(s) 1422 of FIG. 14), a control plane app tier 1524 (e.g., the control plane app tier 1424 of FIG. 14) that can include app subnet(s) 1526 (e.g., app subnet(s) 1426 of FIG. 14), a control plane data tier 1528 (e.g., the control plane data tier 1428 of FIG. 14) that can include database (DB) subnet(s) 1530 (e.g., similar to DB subnet(s) 1430 of FIG. 14). The LB subnet(s) 1522 contained in the control plane DMZ tier 1520 can be communicatively coupled to the app subnet(s) 1526 contained in the control plane app tier 1524 and an Internet gateway 1534 (e.g., the Internet gateway 1434 of FIG. 14) that can be contained in the control plane VCN 1516, and the app subnet(s) 1526 can be communicatively coupled to the DB subnet(s) 1530 contained in the control plane data tier 1528 and a service gateway 1536 (e.g., the service gateway 1436 of FIG. 14) and a network address translation (NAT) gateway 1538 (e.g., the NAT gateway 1438 of FIG. 14). The control plane VCN 1516 can include the service gateway 1536 and the NAT gateway 1538.

The control plane VCN 1516 can include a data plane mirror app tier 1540 (e.g., the data plane mirror app tier 1440 of FIG. 14) that can include app subnet(s) 1526. The app subnet(s) 1526 contained in the data plane mirror app tier 1540 can include a virtual network interface controller (VNIC) 1542 (e.g., the VNIC of 1442) that can execute a compute instance 1544 (e.g., similar to the compute instance 1444 of FIG. 14). The compute instance 1544 can facilitate communication between the app subnet(s) 1526 of the data plane mirror app tier 1540 and the app subnet(s) 1526 that can be contained in a data plane app tier 1546 (e.g., the data plane app tier 1446 of FIG. 14) via the VNIC 1542 contained in the data plane mirror app tier 1540 and the VNIC 1542 contained in the data plane app tier 1546.

The Internet gateway 1534 contained in the control plane VCN 1516 can be communicatively coupled to a metadata management service 1552 (e.g., the metadata management service 1452 of FIG. 14) that can be communicatively coupled to public Internet 1554 (e.g., public Internet 1454 of FIG. 14). Public Internet 1554 can be communicatively coupled to the NAT gateway 1538 contained in the control plane VCN 1516. The service gateway 1536 contained in the control plane VCN 1516 can be communicatively couple to cloud services 1556 (e.g., cloud services 1456 of FIG. 14).

In some examples, the data plane VCN 1518 can be contained in the customer tenancy 1521. In this case, the IaaS provider may provide the control plane VCN 1516 for each customer, and the IaaS provider may, for each customer, set up a unique compute instance 1544 that is contained in the service tenancy 1519. Each compute instance 1544 may allow communication between the control plane VCN 1516, contained in the service tenancy 1519, and the data plane VCN 1518 that is contained in the customer tenancy 1521. The compute instance 1544 may allow resources, that are provisioned in the control plane VCN 1516 that is contained in the service tenancy 1519, to be deployed or otherwise used in the data plane VCN 1518 that is contained in the customer tenancy 1521.

In other examples, the customer of the IaaS provider may have databases that live in the customer tenancy 1521. In this example, the control plane VCN 1516 can include the data plane mirror app tier 1540 that can include app subnet(s) 1526. The data plane mirror app tier 1540 can reside in the data plane VCN 1518, but the data plane mirror app tier 1540 may not live in the data plane VCN 1518. That is, the data plane mirror app tier 1540 may have access to the customer tenancy 1521, but the data plane mirror app tier 1540 may not exist in the data plane VCN 1518 or be owned or operated by the customer of the IaaS provider. The data plane mirror app tier 1540 may be configured to make calls to the data plane VCN 1518 but may not be configured to make calls to any entity contained in the control plane VCN 1516. The customer may desire to deploy or otherwise use resources in the data plane VCN 1518 that are provisioned in the control plane VCN 1516, and the data plane mirror app tier 1540 can facilitate the desired deployment, or other usage of resources, of the customer.

In some embodiments, the customer of the IaaS provider can apply filters to the data plane VCN 1518. In this embodiment, the customer can determine what the data plane VCN 1518 can access, and the customer may restrict access to public Internet 1554 from the data plane VCN 1518. The IaaS provider may not be able to apply filters or otherwise control access of the data plane VCN 1518 to any outside networks or databases. Applying filters and controls by the customer onto the data plane VCN 1518, contained in the customer tenancy 1521, can help isolate the data plane VCN 1518 from other customers and from public Internet 1554.

In some embodiments, cloud services 1556 can be called by the service gateway 1536 to access services that may not exist on public Internet 1554, on the control plane VCN 1516, or on the data plane VCN 1518. The connection between cloud services 1556 and the control plane VCN 1516 or the data plane VCN 1518 may not be live or continuous. Cloud services 1556 may exist on a different network owned or operated by the IaaS provider. Cloud services 1556 may be configured to receive calls from the service gateway 1536 and may be configured to not receive calls from public Internet 1554. Some cloud services 1556 may be isolated from other cloud services 1556, and the control plane VCN 1516 may be isolated from cloud services 1556 that may not be in the same region as the control plane VCN 1516. For example, the control plane VCN 1516 may be located in "Region 1," and cloud service "Deployment 14," may be located in Region 1 and in "Region 2." If a call to Deployment 14 is made by the service gateway 1536 contained in the control plane VCN 1516 located in Region 1, the call may be transmitted to Deployment 14 in Region 1. In this example, the control plane VCN 1516, or Deployment 14 in Region 1, may not be communicatively coupled to, or otherwise in communication with, Deployment 14 in Region 2.

Figure 16:
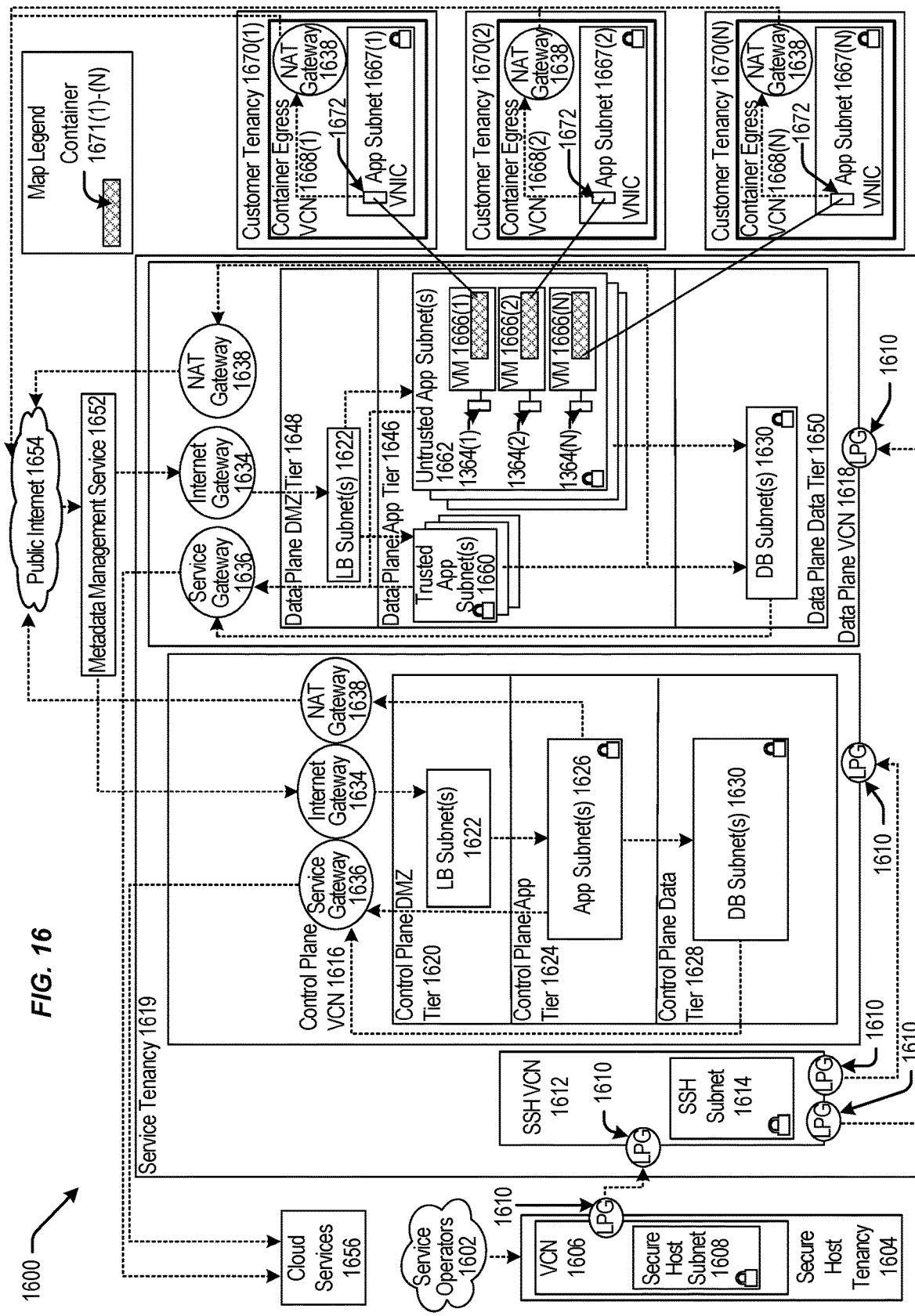
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g., service operators 1402 of FIG. 14) can be communicatively coupled to a secure host tenancy 1604 (e.g., the secure host tenancy 1404 of FIG. 14) that can include a virtual cloud network (VCN) 1606 (e.g., the VCN 1406 of FIG. 14) and a secure host subnet 1608 (e.g., the secure host subnet 1408 of FIG. 14). The VCN 1606 can include an LPG 1610 (e.g., the LPG 1410 of FIG. 14) that can be communicatively coupled to an SSH VCN 1612 (e.g., the SSH VCN 1412 of FIG. 14) via an LPG 1610 contained in the SSH VCN 1612. The SSH VCN 1612 can include an SSH subnet 1614 (e.g., the SSH subnet 1414 of FIG. 14), and the SSH VCN 1612 can be communicatively coupled to a control plane VCN 1616 (e.g., the control plane VCN 1416 of FIG. 14) via an LPG 1610 contained in the control plane VCN 1616 and to a data plane VCN 1618 (e.g., the data plane 1418 of FIG. 14) via an LPG 1610 contained in the data plane VCN 1618. The control plane VCN 1616 and the data plane VCN 1618 can be contained in a service tenancy 1619 (e.g., the service tenancy 1419 of FIG. 14).

The control plane VCN 1616 can include a control plane DMZ tier 1620 (e.g., the control plane DMZ tier 1420 of FIG. 14) that can include load balancer (LB) subnet(s) 1622 (e.g., LB subnet(s) 1422 of FIG. 14), a control plane app tier 1624 (e.g., the control plane app tier 1424 of FIG. 14) that can include app subnet(s) 1626 (e.g., similar to app subnet(s) 1426 of FIG. 14), a control plane data tier 1628 (e.g., the control plane data tier 1428 of FIG. 14) that can include DB subnet(s) 1630. The LB subnet(s) 1622 contained in the control plane DMZ tier 1620 can be communicatively coupled to the app subnet(s) 1626 contained in the control plane app tier 1624 and to an Internet gateway 1634 (e.g., the Internet gateway 1434 of FIG. 14) that can be contained in the control plane VCN 1616, and the app subnet(s) 1626 can be communicatively coupled to the DB subnet(s) 1630 contained in the control plane data tier 1628 and to a service gateway 1636 (e.g., the service gateway of FIG. 14) and a network address translation (NAT) gateway 1638 (e.g., the NAT gateway 1438 of FIG. 14). The control plane VCN 1616 can include the service gateway 1636 and the NAT gateway 1638.

The data plane VCN 1618 can include a data plane app tier 1646 (e.g., the data plane app tier 1446 of FIG. 14), a data plane DMZ tier 1648 (e.g., the data plane DMZ tier 1448 of FIG. 14), and a data plane data tier 1650 (e.g., the data plane data tier 1450 of FIG. 14). The data plane DMZ tier 1648 can include LB subnet(s) 1622 that can be communicatively coupled to trusted app subnet(s) 1660 and untrusted app subnet(s) 1662 of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include one or more primary VNICs 1664(1)-(N) that can be communicatively coupled to tenant virtual machines (VMs) 1666(1)-(N). Each tenant VM 1666(1)-(N) can be communicatively coupled to a respective app subnet 1667(1)-(N) that can be contained in respective container egress VCNs 1668(1)-(N) that can be contained in respective customer tenancies 1670(1)-(N). Respective secondary VNICs 1672(1)-(N) can facilitate communication between the untrusted app subnet(s) 1662 contained in the data plane VCN 1618 and the app subnet contained in the container egress VCNs 1668(1)-(N). Each container egress VCNs 1668(1)-(N) can include a NAT gateway 1638 that can be communicatively coupled to public Internet 1654 (e.g., public Internet 1454 of FIG. 14).

The Internet gateway 1634 contained in the control plane VCN 1616 and contained in the data plane VCN 1618 can be communicatively coupled to a metadata management service 1652 (e.g., the metadata management system 1452 of FIG. 14) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some embodiments, the data plane VCN 1618 can be integrated with customer tenancies 1670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1646. Code to run the function may be executed in the VMs 1666(1)-(N), and the code may not be configured to run anywhere else on the data plane VCN 1618. Each VM 1666(1)-(N) may be connected to one customer tenancy 1670. Respective containers 1671(1)-(N) contained in the VMs 1666(1)-(N) may be configured to run the code. In this case, there can be a dual isolation (e.g., the containers 1671(1)-(N) running code, where the containers 1671(1)-(N) may be contained in at least the VM 1666(1)-(N) that are contained in the untrusted app subnet(s) 1662), which may help prevent incorrect or otherwise undesirable code from damaging the network of the IaaS provider or from damaging a network of a different customer. The containers 1671(1)-(N) may be communicatively coupled to the customer tenancy 1670 and may be configured to transmit or receive data from the customer tenancy 1670. The containers 1671(1)-(N) may not be configured to transmit or receive data from any other entity in the data plane VCN 1618. Upon completion of running the code, the IaaS provider may kill or otherwise dispose of the containers 1671(1)-(N).

In some embodiments, the trusted app subnet(s) 1660 may run code that may be owned or operated by the IaaS provider. In this embodiment, the trusted app subnet(s) 1660 may be communicatively coupled to the DB subnet(s) 1630 and be configured to execute CRUD operations in the DB subnet(s) 1630. The untrusted app subnet(s) 1662 may be communicatively coupled to the DB subnet(s) 1630, but in this embodiment, the untrusted app subnet(s) may be configured to execute read operations in the DB subnet(s) 1630. The containers 1671(1)-(N) that can be contained in the VM 1666(1)-(N) of each customer and that may run code from the customer may not be communicatively coupled with the DB subnet(s) 1630.

In other embodiments, the control plane VCN 1616 and the data plane VCN 1618 may not be directly communicatively coupled. In this embodiment, there may be no direct communication between the control plane VCN 1616 and the data plane VCN 1618. However, communication can occur indirectly through at least one method. An LPG 1610 may be established by the IaaS provider that can facilitate communication between the control plane VCN 1616 and the data plane VCN 1618. In another example, the control plane VCN 1616 or the data plane VCN 1618 can make a call to cloud services 1656 via the service gateway 1636. For example, a call to cloud services 1656 from the control plane VCN 1616 can include a request for a service that can communicate with the data plane VCN 1618.

Figure 17:
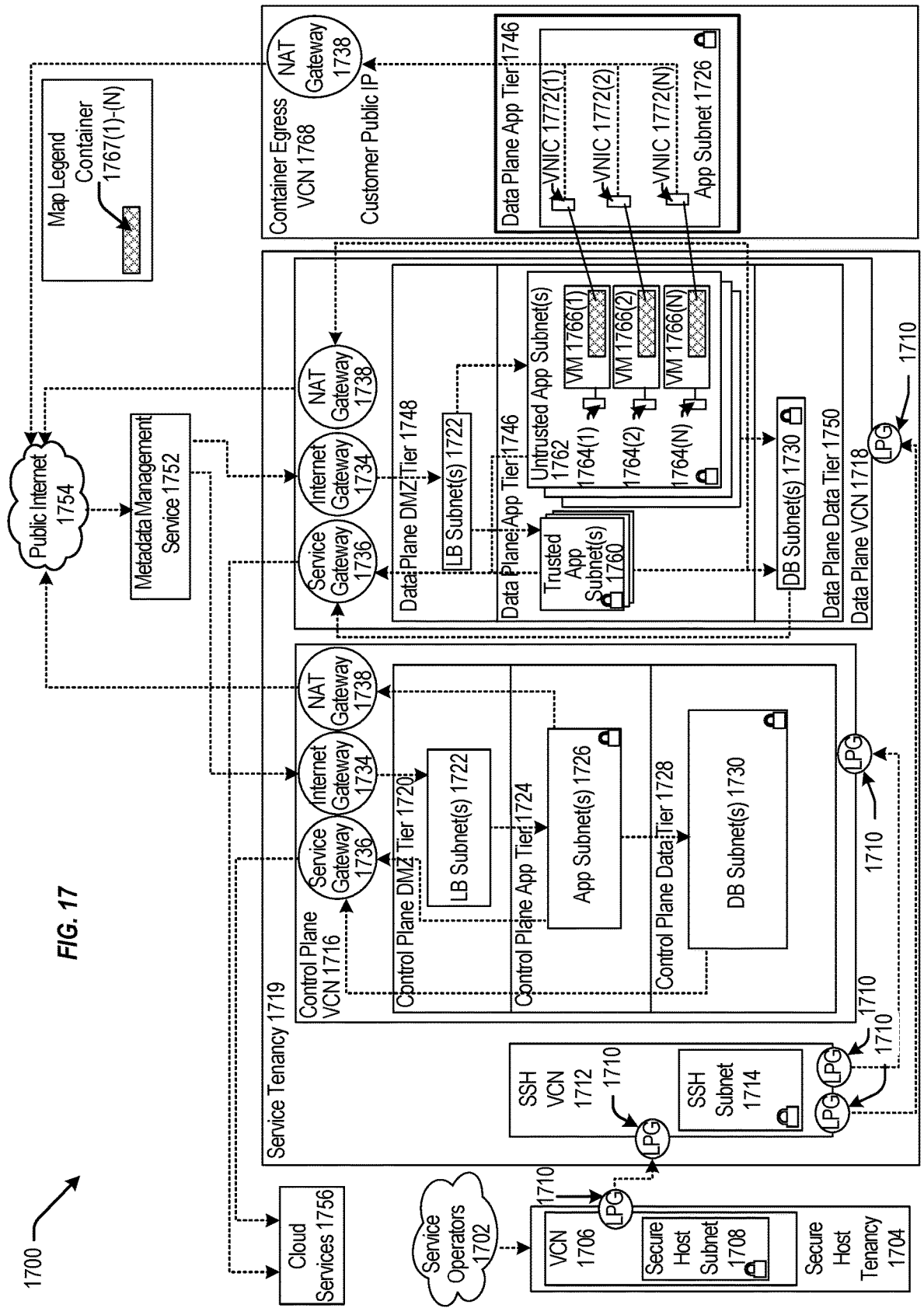
FIG. 17 is a block diagram illustrating another pattern for implementing a cloud infrastructure as a service system, according to at least one embodiment.

FIG. 17 is a block diagram 1700 illustrating another example pattern of an IaaS architecture, according to at least one embodiment. Service operators 1702 (e.g., service operators 1402 of FIG. 14) can be communicatively coupled to a secure host tenancy 1704 (e.g., the secure host tenancy 1404 of FIG. 14) that can include a virtual cloud network (VCN) 1706 (e.g., the VCN 1406 of FIG. 14) and a secure host subnet 1708 (e.g., the secure host subnet 1408 of FIG. 14). The VCN 1706 can include an LPG 1710 (e.g., the LPG 1410 of FIG. 14) that can be communicatively coupled to an SSH VCN 1712 (e.g., the SSH VCN 1412 of FIG. 14) via an LPG 1710 contained in the SSH VCN 1712. The SSH VCN 1712 can include an SSH subnet 1714 (e.g., the SSH subnet 1414 of FIG. 14), and the SSH VCN 1712 can be communicatively coupled to a control plane VCN 1716 (e.g., the control plane VCN 1416 of FIG. 14) via an LPG 1710 contained in the control plane VCN 1716 and to a data plane VCN 1718 (e.g., the data plane 1418 of FIG. 14) via an LPG 1710 contained in the data plane VCN 1718. The control plane VCN 1716 and the data plane VCN 1718 can be contained in a service tenancy 1719 (e.g., the service tenancy 1419 of FIG. 14).

The control plane VCN 1716 can include a control plane DMZ tier 1720 (e.g., the control plane DMZ tier 1420 of FIG. 14) that can include LB subnet(s) 1722 (e.g., LB subnet(s) 1422 of FIG. 14), a control plane app tier 1724 (e.g., the control plane app tier 1424 of FIG. 14) that can include app subnet(s) 1726 (e.g., app subnet(s) 1426 of FIG. 14), a control plane data tier 1728 (e.g., the control plane data tier 1428 of FIG. 14) that can include DB subnet(s) 1730 (e.g., DB subnet(s) 1630 of FIG. 16). The LB subnet(s) 1722 contained in the control plane DMZ tier 1720 can be communicatively coupled to the app subnet(s) 1726 contained in the control plane app tier 1724 and to an Internet gateway 1734 (e.g., the Internet gateway 1434 of FIG. 14) that can be contained in the control plane VCN 1716, and the app subnet(s) 1726 can be communicatively coupled to the DB subnet(s) 1730 contained in the control plane data tier 1728 and to a service gateway 1736 (e.g., the service gateway of FIG. 14) and a network address translation (NAT) gateway 1738 (e.g., the NAT gateway 1438 of FIG. 14). The control plane VCN 1716 can include the service gateway 1736 and the NAT gateway 1738.

The data plane VCN 1718 can include a data plane app tier 1746 (e.g., the data plane app tier 1446 of FIG. 14), a data plane DMZ tier 1748 (e.g., the data plane DMZ tier 1448 of FIG. 14), and a data plane data tier 1750 (e.g., the data plane data tier 1450 of FIG. 14). The data plane DMZ tier 1748 can include LB subnet(s) 1722 that can be communicatively coupled to trusted app subnet(s) 1760 (e.g., trusted app subnet(s) 1660 of FIG. 16) and untrusted app subnet(s) 1762 (e.g., untrusted app subnet(s) 1662 of FIG. 16) of the data plane app tier 1746 and the Internet gateway 1734 contained in the data plane VCN 1718. The trusted app subnet(s) 1760 can be communicatively coupled to the service gateway 1736 contained in the data plane VCN 1718, the NAT gateway 1738 contained in the data plane VCN 1718, and DB subnet(s) 1730 contained in the data plane data tier 1750. The untrusted app subnet(s) 1762 can be communicatively coupled to the service gateway 1736 contained in the data plane VCN 1718 and DB subnet(s) 1730 contained in the data plane data tier 1750. The data plane data tier 1750 can include DB subnet(s) 1730 that can be communicatively coupled to the service gateway 1736 contained in the data plane VCN 1718.

The untrusted app subnet(s) 1762 can include primary VNICs 1764(1)-(N) that can be communicatively coupled to tenant virtual machines (VMs) 1766(1)-(N) residing within the untrusted app subnet(s) 1762. Each tenant VM 1766(1)-(N) can run code in a respective container 1767(1)-(N) and be communicatively coupled to an app subnet 1726 that can be contained in a data plane app tier 1746 that can be contained in a container egress VCN 1768. Respective secondary VNICs 1772(1)-(N) can facilitate communication between the untrusted app subnet(s) 1762 contained in the data plane VCN 1718 and the app subnet contained in the container egress VCN 1768. The container egress VCN can include a NAT gateway 1738 that can be communicatively coupled to public Internet 1754 (e.g., public Internet 1454 of FIG. 14).

The Internet gateway 1734 contained in the control plane VCN 1716 and contained in the data plane VCN 1718 can be communicatively coupled to a metadata management service 1752 (e.g., the metadata management system 1452 of FIG. 14) that can be communicatively coupled to public Internet 1754. Public Internet 1754 can be communicatively coupled to the NAT gateway 1738 contained in the control plane VCN 1716 and contained in the data plane VCN 1718. The service gateway 1736 contained in the control plane VCN 1716 and contained in the data plane VCN 1718 can be communicatively couple to cloud services 1756.

In some examples, the pattern illustrated by the architecture of block diagram 1700 of FIG. 17 may be considered an exception to the pattern illustrated by the architecture of block diagram 1600 of FIG. 16 and may be desirable for a customer of the IaaS provider if the IaaS provider cannot directly communicate with the customer (e.g., a disconnected region). The respective containers 1767(1)-(N) that are contained in the VMs 1766(1)-(N) for each customer can be accessed in real-time by the customer. The containers 1767(1)-(N) may be configured to make calls to respective secondary VNICs 1772(1)-(N) contained in app subnet(s) 1726 of the data plane app tier 1746 that can be contained in the container egress VCN 1768. The secondary VNICs 1772(1)-(N) can transmit the calls to the NAT gateway 1738 that may transmit the calls to public Internet 1754. In this example, the containers 1767(1)-(N) that can be accessed in real-time by the customer can be isolated from the control plane VCN 1716 and can be isolated from other entities contained in the data plane VCN 1718. The containers 1767(1)-(N) may also be isolated from resources from other customers.

In other examples, the customer can use the containers 1767(1)-(N) to call cloud services 1756. In this example, the customer may run code in the containers 1767(1)-(N) that requests a service from cloud services 1756. The containers 1767(1)-(N) can transmit this request to the secondary VNICs 1772(1)-(N) that can transmit the request to the NAT gateway that can transmit the request to public Internet 1754. Public Internet 1754 can transmit the request to LB subnet(s) 1722 contained in the control plane VCN 1716 via the Internet gateway 1734. In response to determining the request is valid, the LB subnet(s) can transmit the request to app subnet(s) 1726 that can transmit the request to cloud services 1756 via the service gateway 1736.

It should be appreciated that IaaS architectures 1400, 1500, 1600, 1700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 18:
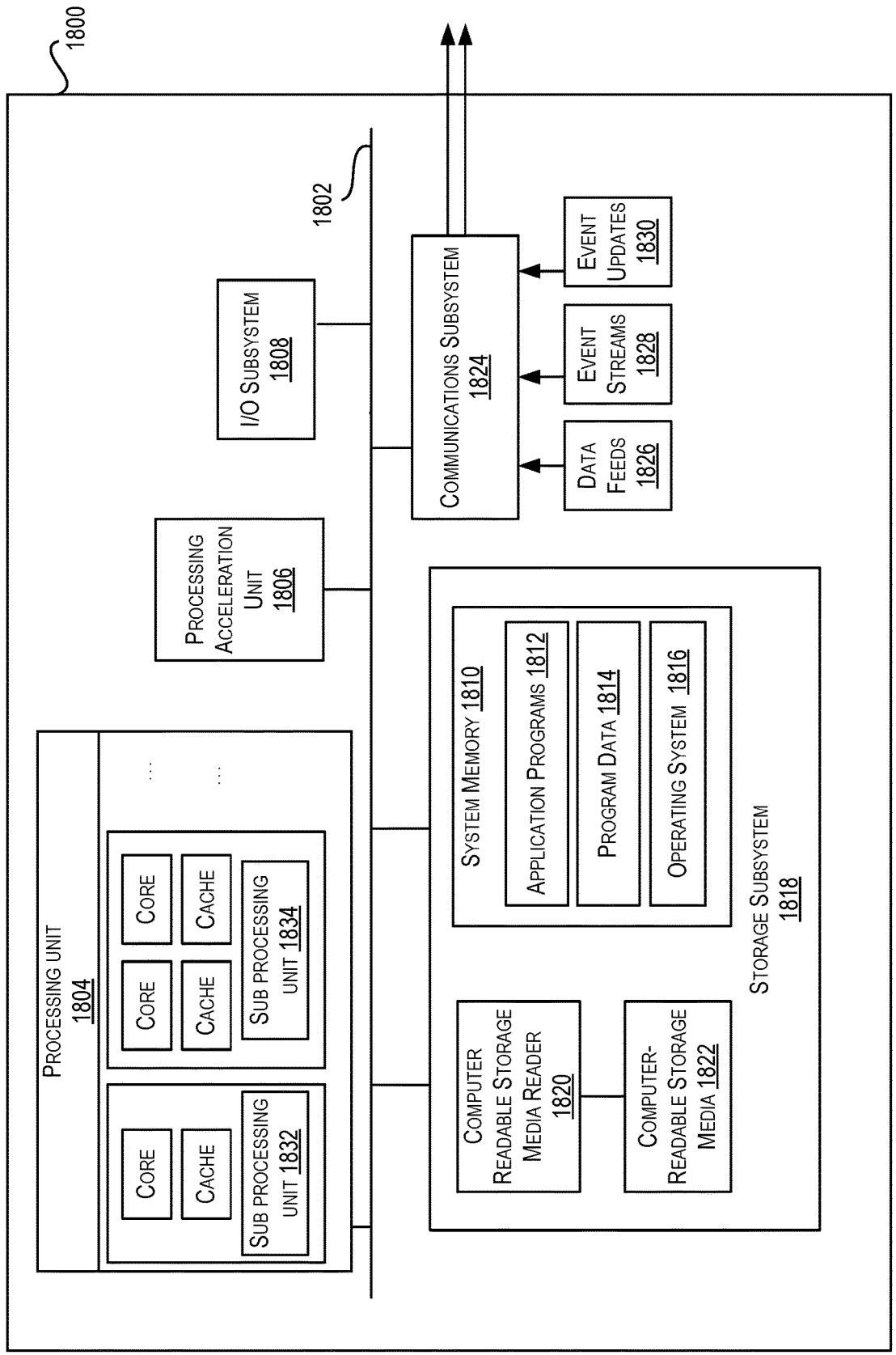
FIG. 18 is a block diagram illustrating an example computer system, according to at least one embodiment.

FIG. 18 illustrates an example computer system 1800, in which various embodiments may be implemented. The system 1800 may be used to implement any of the computer systems described above. As shown in the figure, computer system 1800 includes a processing unit 1804 that communicates with a number of peripheral subsystems via a bus subsystem 1802. These peripheral subsystems may include a processing acceleration unit 1806, an I/O subsystem 1808, a storage subsystem 1818 and a communications subsystem 1824. Storage subsystem 1818 includes tangible computer-readable storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative embodiments of the bus subsystem may utilize multiple buses. Bus subsystem 1802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1804, which can be implemented as one or more integrated circuits (e.g., a conventional microprocessor or microcontroller), controls the operation of computer system 1800. One or more processors may be included in processing unit 1804. These processors may include single core or multicore processors. In certain embodiments, processing unit 1804 may be implemented as one or more independent processing units 1832 and/or 1834 with single or multicore processors included in each processing unit. In other embodiments, processing unit 1804 may also be implemented as a quad-core processing unit formed by integrating two dual-core processors into a single chip.

In various embodiments, processing unit 1804 can execute a variety of programs in response to program code and can maintain multiple concurrently executing programs or processes. At any given time, some or all of the program code to be executed can be resident in processor(s) 1804 and/or in storage subsystem 1818. Through suitable programming, processor(s) 1804 can provide various functionalities described above. Computer system 1800 may additionally include a processing acceleration unit 1806, which can include a digital signal processor (DSP), a special-purpose processor, and/or the like.

I/O subsystem 1808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1800 may comprise a storage subsystem 1818 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1804 provide the functionality described above. Storage subsystem 1818 may also provide a repository for storing data used in accordance with the present disclosure.

As depicted in the example in FIG. 18, storage subsystem 1818 can include various components including a system memory 1810, computer-readable storage media 1822, and a computer readable storage media reader 1820. System memory 1810 may store program instructions that are loadable and executable by processing unit 1804. System memory 1810 may also store data that is used during the execution of the instructions and/or data that is generated during the execution of the program instructions. Various different kinds of programs may be loaded into system memory 1810 including but not limited to client applications, Web browsers, mid-tier applications, relational database management systems (RDBMS), virtual machines, containers, etc.

System memory 1810 may also store an operating system 1816. Examples of operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1800 executes one or more virtual machines, the virtual machines along with their guest operating systems (GOSs) may be loaded into system memory 1810 and executed by one or more processors or cores of processing unit 1804.

System memory 1810 can come in different configurations depending upon the type of computer system 1800. For example, system memory 1810 may be volatile memory (such as random-access memory (RAM)) and/or non-volatile memory (such as read-only memory (ROM), flash memory, etc.) Different types of RAM configurations may be provided including a static random-access memory (SRAM), a dynamic random-access memory (DRAM), and others. In some implementations, system memory 1810 may include a basic input/output system (BIOS) containing basic routines that help to transfer information between elements within computer system 1800, such as during start-up.

Computer-readable storage media 1822 may represent remote, local, fixed, and/or removable storage devices plus storage media for temporarily and/or more permanently containing, storing, computer-readable information for use by computer system 1800 including instructions executable by processing unit 1804 of computer system 1800.

Computer-readable storage media 1822 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magnetoresistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for computer system 1800.

Machine-readable instructions executable by one or more processors or cores of processing unit 1804 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to connect to one or more devices via the Internet. In some embodiments communications subsystem 1824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

In some embodiments, communications subsystem 1824 may also receive input communication in the form of structured and/or unstructured data feeds 1826, event streams 1828, event updates 1830, and the like on behalf of one or more users who may use computer system 1800.

By way of example, communications subsystem 1824 may be configured to receive data feeds 1826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1824 may also be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1824 may also be configured to output the structured and/or unstructured data feeds 1826, event streams 1828, event updates 1830, and the like to one or more databases that may be in communication with one or more streaming data source computers coupled to computer system 1800.

Computer system 1800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   identifying, by a software agent executing at a smart network interface card of a cloud-computing environment, a performance threshold associated with established network connections of one or more active network paths between the smart network interface card and a data plane component of the cloud-computing environment;
   executing, by the software agent, operations that cause respective network connections for the one or more active network paths to be established between the smart network interface card and one or more endpoints associated with the data plane component of the cloud-computing environment; and
   modifying, by the software agent, a quantity of established network connections of the one or more active network paths between the smart network interface card and the data plane component based at least in part on 1) comparing a throughput value associated with network traffic that utilizes the established network connections of the one or more active network paths to the performance threshold and 2) determining that the network traffic that utilizes the established network connections has met a condition related to the performance threshold.

2. The computer-implemented method of claim 1, wherein the data plane component is a block storage volume.

3. The computer-implemented method of claim 1, wherein executing the operations that cause the respective network connections for the one or more active network paths to be established comprises instructing a non-volatile memory express over transmission control protocol (NVMe/TCP) initiator of the smart network interface card to establish the one or more active network paths between the smart network interface card and the one or more endpoints associated with the data plane component.

4. The computer-implemented method of claim 1, wherein the performance threshold corresponds to a number of input/output operations that are able to be processed by the data plane component over a time period.

5. The computer-implemented method of claim 1, further comprising calculating a number of active network paths needed to meet the performance threshold associated with the data plane component, the number of active network paths being calculated based at least in part on a throughput capability associated with each active network path needed, wherein the one or more active network paths comprise the number of active network paths needed to meet the performance threshold.

6. The computer-implemented method of claim 1, further comprising:
monitoring, by the software agent over a time period, network traffic of the one or more active network paths; and
calculating the throughput value based at least in part on identifying input/output operations of the network traffic over the time period.

7. The computer-implemented method of claim 1, wherein modifying the quantity of the one or more active network paths comprises increasing the quantity of the one or more active network paths based at least in part on determining, by the software agent, that the throughput value has exceeded the performance threshold for at least a threshold period of time.

8. The computer-implemented method of claim 1, further comprising receiving, from a block storage control plane, configuration information corresponding to the one or more active network paths to be established between the smart network interface card and the data plane component, wherein the quantity of the one or more active network paths is specified in the configuration information received from the block storage control plane.

9. The computer-implemented method of claim 8, wherein the one or more active network paths form a first subset of a plurality of network paths, and wherein the configuration information identifies a second subset of the plurality of network paths corresponding to passive network paths for which no network connection has been established.

10. The computer-implemented method of claim 9, wherein each passive network path serves as a failover when an established connection of an active network path becomes unavailable.

11. A smart network interface card, comprising:
one or more processors; and
one or more memories storing computer-executable instructions that, when executed by the one or more processors, cause the one or more processors to:
receive, by a non-volatile memory express initiator of the smart network interface card from a software agent executing at the smart network interface card, instructions to establish connections for one or more active network paths between the smart network interface card and a data plane endpoint associated with a data plane resource, the smart network interface card being configured to determine whether throughput associated with network traffic that utilizes established network connections of the one or more active network paths has met a condition related to a performance threshold that is associated with the established network connections;
in response to receiving the instructions, establishing, by the non-volatile memory express initiator, the established network connections corresponding to the one or more active network paths between the smart network interface card and the data plane endpoint; and
modifying a quantity of the established network connections of the one or more active network paths based at least in part on receiving subsequent instructions from the software agent.

12. The smart network interface card of claim 11, wherein the subsequent instructions received from the software agent comprise termination instructions, and wherein modifying the quantity of the established network connections of the one or more active network paths comprises terminating one or more established network connections of the one or more active network paths.

13. The smart network interface card of claim 12, wherein the software agent transmits the termination instructions based at least in part on determining that a rate associated with the network traffic that utilizes the established network connections has fallen below the performance threshold.

14. The smart network interface card of claim 11, wherein the subsequent instructions received from the software agent indicates an additional network connection is to be established between the smart network interface card and the data plane resource, and wherein modifying the quantity of the established network connections comprises establishing at least one additional network connection between the smart network interface card and the data plane resource.

15. The smart network interface card of claim 14, wherein the software agent transmits the instructions based at least in part on determining that network traffic of the established network connections has exceeded the performance threshold.

16. The smart network interface card of claim 15, wherein executing the computer-executable instructions further causes the one or more processors to update the performance threshold subsequent to modifying the quantity of the established network connections.

17. The smart network interface card of claim 11, wherein executing the computer-executable instructions that modify the quantity of the established network connections comprises activating a passive network path of a path group and deactivating an active network path of the path group.

18. The smart network interface card of claim 17, wherein executing the computer-executable instructions further causes the one or more processors to update configuration information associated with the path group to designate the passive network path as active and the active network path as passive.

19. The smart network interface card of claim 11, wherein configuration information comprising corresponding pairs of IP addresses for each of the established network connections is stored at the smart network interface card, and wherein the non-volatile memory express initiator establishes each of the one or more established network connections based at least in part on a corresponding pair of IP addresses from the configuration information.

20. The smart network interface card of claim 11, wherein a first IP address of the corresponding pair of IP addresses is associated with the smart network interface card, and wherein a second IP address of thecorresponding pair of IP addresses is associated with the data plane resource.

* * * * *